United States Patent
Casey et al.

(10) Patent No.: US 11,830,229 B2
(45) Date of Patent: *Nov. 28, 2023

(54) VISIBLE LIGHT SENSOR CONFIGURED FOR DETECTION OF GLARE CONDITIONS

(71) Applicant: Lutron Technology Company LLC, Coopersburg, PA (US)

(72) Inventors: Craig Alan Casey, Coopersburg, PA (US); Brent Protzman, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,981

(22) Filed: Dec. 20, 2022

(65) Prior Publication Data

US 2023/0123426 A1    Apr. 20, 2023

Related U.S. Application Data

(63) Continuation of application No. 16/795,480, filed on Feb. 19, 2020, now Pat. No. 11,570,868.

(Continued)

(51) Int. Cl.
*G06V 10/10* (2022.01)
*H05B 47/11* (2020.01)
(Continued)

(52) U.S. Cl.
CPC .............. *G06V 10/10* (2022.01); *E06B 9/42* (2013.01); *G06V 10/60* (2022.01); *H05B 47/11* (2020.01); *H05B 47/19* (2020.01)

(58) Field of Classification Search
CPC ........... E06B 9/42; G06V 10/60; H05B 47/11; H05B 47/19
See application file for complete search history.

(56) References Cited

U.S. PATENT DOCUMENTS 5,248,919 A    9/1993    Hanna et al.
7,391,297 B2    6/2008    Cash et al.
(Continued)

FOREIGN PATENT DOCUMENTS

EP    3293962 A1    3/2018
JP    2018199921 A    * 12/2018
(Continued)

OTHER PUBLICATIONS

Smith, Joe, "Calculating Color Temperature and Illuminance using the TAOS TCS3414CS Digital Color Sensor", Intelligent OPTO Sensor, No. 25, Feb. 27, 2009, 7 pages.
(Continued)

*Primary Examiner* — Raymond R Chai
(74) *Attorney, Agent, or Firm* — Flaster Greenberg, P.C.

(57) ABSTRACT

A device may be configured to detect a glare condition and may comprise a photo sensing circuit and a visible light sensing circuit. The photo sensing circuit may be configured to periodically generate an illuminance signal that indicates an illuminance value. The visible light sensing circuit may be configured to periodically record images of the space at an exposure time. The device may receive an illuminance signal from the photo sensing circuit and determine a present illuminance based on the illuminance signal. The device may adjust the frequency at which the visible light sensing circuit records images based on the present illuminance. The exposure time may be determined based on the present illuminance and a glare condition type. An image recorded at a respective exposure time may wash out pixels above a certain illuminance value. The device may detect a glare condition at the location of washed out pixels.

23 Claims, 12 Drawing Sheets

Related U.S. Application Data

(60) Provisional application No. 62/807,631, filed on Feb. 19, 2019.

(51) Int. Cl.
 *H05B 47/19* (2020.01)
 *E06B 9/42* (2006.01)
 *G06V 10/60* (2022.01)

(56) References Cited

U.S. PATENT DOCUMENTS

| | | | |
|---|---|---|---|
| 8,009,042 | B2 | 8/2011 | Steiner et al. |
| 8,199,010 | B2 | 6/2012 | Sloan et al. |
| 8,228,184 | B2 | 7/2012 | Blakeley et al. |
| 8,288,981 | B2 | 10/2012 | Spira et al. |
| 8,410,706 | B2 | 4/2013 | Steiner et al. |
| 8,451,116 | B2 | 5/2013 | Steiner et al. |
| 8,723,466 | B2 | 5/2014 | Chambers et al. |
| 8,950,461 | B2 | 2/2015 | Ogden et al. |
| 9,488,000 | B2 | 11/2016 | Kirby et al. |
| 9,538,603 | B2 | 1/2017 | Abraham et al. |
| 9,546,515 | B2 | 1/2017 | Hall et al. |
| 9,676,696 | B2 | 6/2017 | Hakozaki |
| 9,933,761 | B2 | 4/2018 | Courtney et al. |
| 10,027,127 | B2 | 7/2018 | Crafts et al. |
| 10,264,651 | B2 | 4/2019 | Steiner |
| 10,271,407 | B2 | 4/2019 | Pessina et al. |
| 11,570,868 | B2 * | 1/2023 | Casey ................... H05B 47/11 |
| 2008/0092075 | A1 | 4/2008 | Jacob et al. |
| 2009/0002775 | A1 | 1/2009 | Chen et al. |
| 2009/0206983 | A1 | 8/2009 | Knode et al. |
| 2011/0007588 | A1 | 1/2011 | Li et al. |
| 2013/0030589 | A1 | 1/2013 | Pessina et al. |
| 2016/0056629 | A1 | 2/2016 | Baker et al. |
| 2017/0111567 | A1 * | 4/2017 | Pila ....................... H04N 23/64 |
| 2017/0171941 | A1 | 6/2017 | Steiner et al. |
| 2018/0018748 | A1 | 1/2018 | Petrovic et al. |
| 2018/0041684 | A1 * | 2/2018 | Hilldore ................... B60R 1/00 |
| 2018/0089516 | A1 * | 3/2018 | Govindasamy ........ G06V 20/56 |
| 2018/0167547 | A1 | 6/2018 | Casey |
| 2018/0168015 | A1 | 6/2018 | Casey et al. |
| 2018/0168019 | A1 | 6/2018 | Baker et al. |
| 2018/0168020 | A1 | 6/2018 | Casey et al. |
| 2018/0252035 | A1 | 9/2018 | Casey et al. |
| 2019/0136618 | A1 * | 5/2019 | Hebeisen ............... H05B 47/11 |
| 2019/0384232 | A1 | 12/2019 | Casey et al. |

FOREIGN PATENT DOCUMENTS

| | | | | |
|---|---|---|---|---|
| JP | | 2018199921 A | 12/2018 | |
| WO | | 2017216623 A2 | 12/2017 | |
| WO | WO-2017216623 A2 * | | 12/2017 | ......... H05B 37/0218 |

OTHER PUBLICATIONS

Sushanth, Babu, et al., "Investigation of an Integrated Automated Blinds and Dimmable Lighting System for Tropical Climate in a Rotatable Testbed Facility", Energy and Buildings, vol. 183, Nov. 22, 2018, 356-376.

* cited by examiner

VISIBLE LIGHT SENSOR CONFIGURED FOR DETECTION OF GLARE CONDITIONS

CROSS-REFERENCE TO RELATED APPLICATIONS

This application is a continuation of U.S. Non-Provisional patent application Ser. No. 16/795,480, filed Feb. 19, 2020, which claims priority from U.S. Provisional Patent Application No. 62/807,631, filed Feb. 19, 2019, which are hereby incorporated by reference in their entireties.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature in the user environment.

Each load control system may include various control devices, including input devices and load control devices. The load control devices may receive digital messages, which may include load control instructions, for controlling an electrical load from one or more of the input devices. The load control devices may be capable of directly controlling an electrical load. The input devices may be capable of indirectly controlling the electrical load via the load control device.

Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control. Occupancy sensors may include infrared (IR) sensors for detecting occupancy/vacancy of a space based on movement of the users. Daylight sensors may detect a daylight level received within a space. Color temperature sensors may determine the color temperature within a user environment based on the wavelengths and/or frequencies of light. Temperature sensors may detect the current temperature of the space. Window sensors (e.g., glare sensors) may be positioned facing outside of a building (e.g., on a window or exterior of a building) to measure the total amount of natural light detected outside the building and/or detect glare conditions.

Some load control systems control motorized window treatments to prevent glare conditions inside of the building (e.g., glare conditions caused by direct sunlight shining into the building). The load control system may include a system controller for determining positions to which to control shade fabric of the motorized window treatments to prevent glare conditions based on the predicted location of the sun (e.g., using the present time of the day and year, the location and/or orientation of the building, etc.). The load control system may automatically control the motorized window treatments throughout the day according to the estimated positions of the sun. The load control system may also include window sensors that are configured to detect low light conditions (e.g., on cloudy days) and/or high light conditions (e.g., on extremely bright days) to enable the system controller to override the automatic control of the motorized window treatments on cloudy days and bright days. However, such load control systems require complicated configuration procedure and advanced system controller to operate appropriately. These systems are also performing estimation of daylight glare based on known conditions (e.g., the present time of the day and year, the location and/or orientation of the building, etc.) and/or a total amount of daylight sensed at the location of a given sensor. Examples of such a load control system is described in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

In certain situations, daylight glare may be distracting to an occupant, but may go undetected by current systems inside a building. For example, daylight glare may be allowed inside of an occupant's space, but may go undetected due to the relative amount of glare being small or undetectable by prior systems, even though the intensity of the daylight glare may be high. This type of glare condition may be considered "noise" and may result in a load control system unnecessarily and/or inaccurately controlling motorized window treatments. For example, such sources of daylight glare may be caused by reflections on small surfaces outside of a window, ripples in a body of water, or rain drops on the window. Accordingly, load control systems may filter this "noise" when detecting glare conditions and/or determining positions for motorized window treatments.

SUMMARY

A device may be configured to detect glare conditions. The device may comprise a photo sensing circuit and a visible light sensing circuit. The photo sensing circuit may be configured to periodically generate an illuminance signal that indicates an illuminance within a space. The visible light sensing circuit may be configured to periodically record images of the space. The device may receive an illuminance signal from the photo sensing circuit. The device may determine a present illuminance based on the illuminance signal. The device may adjust the frequency (e.g., an image processing (IP) rate) at which the visible light sensing circuit records and/or processes images of the space to determine the presence of a glare condition based on the present illuminance.

The device may track the present illuminance of the space and adjust the frequency at which the visible light sensing circuit records images of the space based on the change in the illuminance. For example, the device may receive an illuminance signal from the photo sensing circuit and determine a present illuminance value based on the illuminance signal. The device may compare the present illuminance value to a previous illuminance value and determine a change in the illuminance of the space. The device may compare the change in illuminance to a threshold. The device may adjust the frequency (e.g., the IP rate) at which the visible light sensing circuit records and/or process images (e.g., to determine the presence of a glare condition) of the space when the change in illuminance is greater than or equal to the threshold. Also, or alternatively, the device may compare the change in illuminance of the space to a threshold and adjust the frequency at which the visible light sensing circuit records and/or processes images of the space (e.g., to determine the presence of a glare condition) when the change in illuminance is less than the threshold.

The device may record images of the space, via the visible light sensing circuit, at an exposure time. The exposure time may be determined based on the present illuminance and a glare condition type. The glare condition type may indicate the type of glare condition (e.g. small glare condition, large glare condition, absolute glare condition, relative glare condition contrast glare conditions), and/or any combination thereof) that the device is detecting. The device may receive an illuminance signal from the photo sensing circuit and determine a present illuminance based on the illuminance signal. The device may determine a contrast-based exposure time based on the present illuminance and the glare condition type. The device may compare the contrast-based exposure time to an absolute exposure time to determine a capture exposure time. The capture exposure time may include the contrast-based exposure time when the contrast based exposure time is greater than or equal to the absolute exposure time. The capture exposure time may include the absolute exposure time when the contrast-based exposure time is less than the absolute exposure time. The device may record the image at the capture exposure time. An image recorded at a respective exposure time may wash out pixels above a certain illuminance value. The device may detect a glare condition at the location of a washed out pixel. In addition, the device may find the lowest washed out pixel in the image and remove the glare condition at the location of the lowest washed out pixel. For example, the device may transmit shade control commands that include control instructions to transition the shade of a motorized window treatment to the location of the lowest washed out pixel and/or remove the glare condition.

DETAILED DESCRIPTION

Figure 1:
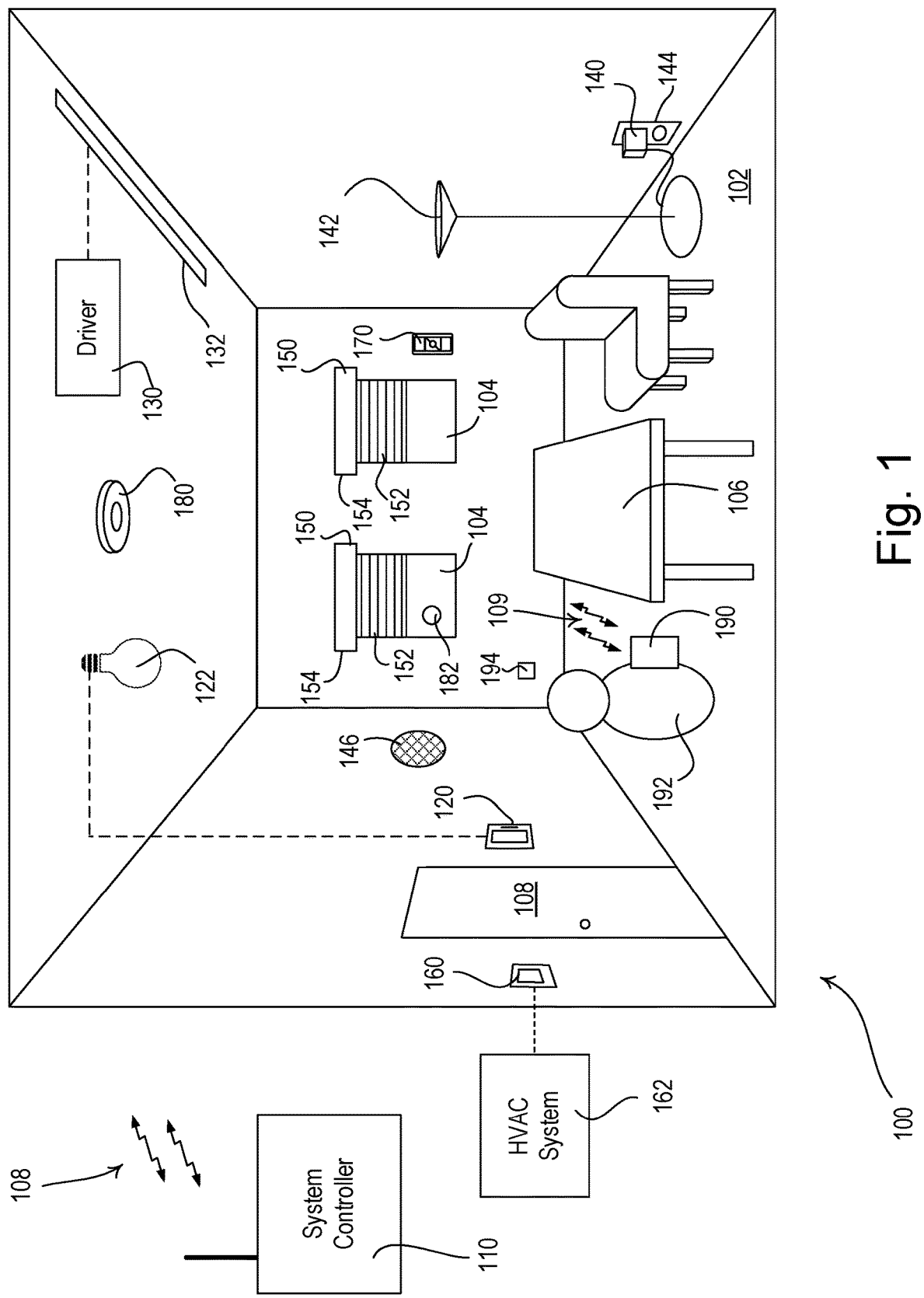
FIG. 1 is a diagram of an example load control system having visible light sensors.

FIG. 1 is a diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively, or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and/or a control-target device.

The control-source devices may be configured to transmit digital messages directly to the control-target devices. In addition, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The control-source devices, the control-target devices, and/or the system controller 110 may be configured to transmit and receive the RF signals 108 using a proprietary RF protocol, such as the ClearConnect® protocol, or another protocol, such as the Zigbee® protocol, Thread® protocol, or another wireless protocol. Alternatively, the RF signals 108 may be transmitted between one or more devices using a different RF protocol, such as, a standard protocol, for example, one of WIFI, ZIGBEE, Z-WAVE, KNX-RF, ENOCEAN RADIO protocols, or a different proprietary protocol.

The load control system 100 may comprise one or more load control devices, e.g., a dimmer switch 120 for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which may be arranged in a linear array and are illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Pat. No. 9,676,696, issued Jun. 13, 2017, entitled WIRELESS LOAD CONTROL DEVICE, the entire disclosures of which are hereby incorporated by reference.

The dimmer switch 120 may be configured to wirelessly receive digital messages via the RF signals 108 (e.g., from the system controller 110) and to control the lighting load 122 in response to the received digital messages. Examples of dimmer switches operable to transmit and receive digital messages is described in greater detail in commonly-assigned U.S. Patent Application Publication No. 2009/0206983, published Aug. 20, 2009, entitled COMMUNICATION PROTOCOL FOR A RADIO-FREQUENCY LOAD CONTROL SYSTEM, the entire disclosure of which is hereby incorporated by reference.

The load control system 100 may comprise one or more remotely-located load control devices, such as a light-emitting diode (LED) driver 130 for driving an LED light source 132 (e.g., an LED light engine). The LED driver 130 may be located remotely, for example, in or adjacent to the lighting fixture of the LED light source 132. The LED driver 130 may be configured to receive digital messages via the RF signals 108 (e.g., from the system controller 110) and to control the LED light source 132 in response to the received digital messages. The LED driver 130 may be configured to adjust the color temperature of the LED light source 132 in response to the received digital messages. Examples of LED drivers configured to control the color temperature of LED light sources are described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference. The load control system 100 may further comprise other types of remotely-located load control devices, such as, for example, electronic dimming ballasts for driving fluorescent lamps.

The load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive digital messages via the RF signals 108 (e.g., from the system controller 110) and to turn on and off or adjust the intensity of the floor lamp 142 in response to the received digital messages.

Alternatively, or additionally, the load control system 100 may comprise controllable receptacles for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive digital messages via the RF signals 108 (e.g., from the system controller 110) and adjust the position of the respective window treatment fabric 152 in response to the received digital messages. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference. In addition, the daylight control device may comprise controllable dynamic glass (e.g., smart glass and/or electrochromic glass) and/or indoor or outdoor controllable louvers.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate digital messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive digital messages via the RF signals 108 (e.g., from the system controller 110) and adjust heating, ventilation, and cooling in response to the received digital messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a remote control device 170, a first visible light sensor 180 (e.g., a room sensor), and/or a second visible light sensor 182 (e.g., a window sensor). The input devices may be fixed or movable input devices. The system controller 110 may be configured to transmit one or more digital messages to the load control devices (e.g., the dimmer switch 120, the LED driver 130, the plug-in load control device 140, the motorized window treatments 150, and/or the thermostat 160) in response to the digital messages received from the remote control device 170 and/or the visible light sensors 180, 182. The remote control device 170 and/or the visible light sensors 180, 182 may be configured to transmit digital messages directly to the dimmer switch 120, the LED driver 130, the plug-in load control device 140, the motorized window treatments 150, and/or the temperature control device 160.

The remote control device 170 may be configured to transmit digital messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). The system controller 110 may be configured to communicate via the network with one or more other control systems (e.g., a building management system, a security system, etc.).

The mobile device 190 may be configured to transmit digital messages to the system controller 110, for example, in one or more Internet Protocol packets. For example, the mobile device 190 may be configured to transmit digital messages to the system controller 110 over the LAN and/or via the internet. The mobile device 190 may be configured to transmit digital messages over the internet to an external service (e.g., If This Then That (IFTTT®) service), and then the digital messages may be received by the system controller 110. The mobile device 190 may transmit and receive RF signals 109 via a Wi-Fi communication link, a Wi-MAX communications link, a Bluetooth communications link, a near field communication (NFC) link, a cellular communications link, a television white space (TVWS) communication link, another wireless communication link, or any combination thereof. The mobile device 190 may be configured to transmit RF signals according to the proprietary protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Pat. No. 10,271,407, issued Apr. 23, 2019, entitled LOAD CONTROL DEVICE HAVING INTERNET CONNECTIVITY, the entire disclosure of which is hereby incorporated by reference.

The system controller 110 may be configured to determine the location of the mobile device 190 and/or the occupant 192. For example, the location of the mobile device 190 and/or the occupant 192 may be determined using global positioning satellites (GPS), beacon signals, etc. The system controller 110 may be configured to control (e.g., automatically control) the load control devices (e.g., the dimmer switch 120, the LED driver 130, the plug-in load control device 140, the motorized window treatments 150, and/or the temperature control device 160) in response to determining the location of the mobile device 190 and/or the occupant 192. One or more of the control devices of the load control system 100 may transmit beacon signals, for example, RF beacon signals transmitted using a short-range and/or low-power RF technology, such as Bluetooth technology. The load control system 100 may also comprise at least one beacon transmitting device 194 for transmitting the beacon signals. The mobile device 190 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 190. The mobile device 190 may be configured to transmit the unique identifier to the system controller 110, which may be configured to determine the location of the mobile device 190 using the unique identifier (e.g., using data stored in memory or retrieved via the Internet). An example of a load control system for controlling one or more electrical loads in response to the position of a mobile device and/or occupant inside of a building is described in greater detail in commonly-assigned U.S. Patent Application Publication No. 2016/0056629, published Feb. 25, 2016, entitled LOAD CONTROL SYSTEM RESPONSIVE TO LOCATION OF AN OCCUPANT AND MOBILE DEVICES, the entire disclosure of which is hereby incorporated by reference.

The visible light sensors 180, 182 may each comprise, for example, a camera, and/or a fish-eye lens. The camera of the first visible light sensor 180 may be directed into the room 102 and may be configured to record images of the room 102. For example, the first visible light sensor 180 may be mounted to a ceiling of the room 102 (as shown in FIG. 1), and/or may be mounted to a wall of the room. If the first visible light sensor 180 is mounted to the ceiling, the images recorded by the camera may be top down views of the room 102. The camera of the second visible light sensor 182 may be directed outside of the room 102 (e.g., out of the window 104) and may be configured to record images from outside of the building. For example, the second visible light sensor 182 may be mounted to one of the windows 104 (as shown in FIG. 1), and/or may be mounted to the exterior of the building.

The visible light sensors 180, 182 may each be configured to process images recorded by the camera and transmit one or more messages (e.g., digital messages) to the load control devices in response to the processed images. Each visible light sensor 180, 182 may be configured to sense one or more environmental characteristics of a space (e.g., the room 102 and/or the room 200) from the images. For example, the first visible light sensor 180 may be configured to operate in one or more sensor modes (e.g., an occupancy and/or vacancy sensor mode, a daylight sensor mode, a color sensor mode, a glare detection sensor mode, an occupant count mode, etc.). The second visible light sensor 182 may be configured to operate in one or more same or different sensor modes (e.g., a color sensor mode, a glare detection sensor mode, a weather sensor mode, etc.). Each visible light sensor 180, 182 may execute different algorithms to process the images in each of the sensor modes to determine data to transmit to the load control devices. The visible light sensors 180, 182 may each transmit digital messages via the RF signals 108 (e.g., using the proprietary protocol) in response to the images. The visible light sensors 180, 182 may each send the digital messages directly to the load control devices and/or to the system controller 110, which may then communicate the messages to the load control devices. Each visible light sensor 180, 182 may comprise a first communication circuit for transmitting and receiving the RF signals 108 using the proprietary protocol.

The visible light sensors 180, 182 may each be configured to perform a plurality of sensor events to sense various environmental characteristics of the interior and/or the exterior of the room 102. For example, to perform a sensor event, each visible light sensor 180, 182 may be configured to operate in one of a plurality of sensor modes to execute one or more corresponding algorithms to sense the environmental characteristic. Each visible light sensor 180, 182 may configured to obtain from memory certain pre-configured operational characteristics (e.g., sensitivity, baseline values, threshold values, limit values, etc.) that may be used by the algorithm to sense the environmental characteristic during the sensor event.

Further, each visible light sensor 180, 182 may be configured to focus on one or more regions of interest in the image recorded by the camera when processing the image to sense the environmental characteristic during the sensor event. For example, certain areas of the image recorded by the camera of one of the visible light sensors 180, 182 may be masked (e.g., digitally masked), such that the respective visible light sensor may not process the portions of the image in the masked areas. Each visible light sensor 180, 182 may be configured to apply a mask (e.g., a predetermined digital mask that may be stored in memory) to focus on a specific region of interest, and process the portion of the image in the region of interest. Each visible light sensor 180, 182 may be configured to focus on multiple regions of interest in the image at the same time. Specific mask(s) may be defined for each sensor event.

The visible light sensors 180, 182 may each be configured to dynamically change between the sensor modes, apply digital masks to the images, and/or adjust operational characteristics depending upon the present sensor event. Each visible light sensor 180, 182 may be configured to perform a number of different sensor events to sense a plurality of the environmental characteristics of the space. For example, each visible light sensor 180, 182 may be configured to sequentially and/or periodically step through the sensor events to sense the plurality of the environmental characteristics of the space. Each sensor event may be characterized by a sensor mode (e.g., specifying an algorithm to use), one or more operational characteristics, and/or one or more digital masks. An example of a visible light sensor having multiple sensor modes is described in greater detail in commonly-assigned U.S. Pat. No. 10,264,651, issued Apr. 16, 2019, entitled LOAD CONTROL SYSTEM HAVING A VISIBLE LIGHT SENSOR, the entire disclosure of which is hereby incorporated by reference.

The first visible light sensor 180 may be configured to operate in the occupancy and/or vacancy sensor mode to determine an occupancy and/or vacancy condition in the room 102 in response to detection of movement within one or more regions of interest. The first visible light sensor 180 may be configured to use an occupancy and/or vacancy detection algorithm to determine that the room 102 is occupied in response to the amount of movement and/or the velocity of movement exceeding an occupancy threshold.

During a sensor event for detecting occupancy and/or vacancy, the first visible light sensor 180 may be configured to apply a predetermined mask to focus on one or more regions of interest in one or more images recorded by the camera and determine occupancy or vacancy of the space based on detecting or not detecting motion in the regions of interest. The first visible light sensor 180 may be responsive to movement in the regions of interest and be unresponsive to movement in the masked-out areas. For example, the first visible light sensor 180 may be configured to apply a mask to an image of the room to exclude detection of motion in the doorway 108 and/or the windows 104 of the room 102, and may focus on a region of interest that includes the interior space of the room. The first visible light sensor 180 may be configured to apply a first mask to focus on a first region of interest, apply a second mask to focus on a second region of interest, and determine occupancy or vacancy based on movement detected in either of the regions of interest. The first visible light sensor 180 may be configured to focus on multiple regions of interest in image(s) at the same time by applying different masks to the image(s).

The first visible light sensor 180 may be configured to adjust certain operational characteristics (e.g., sensitivity) to be used by the occupancy and/or vacancy algorithm depending upon the present sensor event. The occupancy threshold may be dependent upon the sensitivity. For example, the first visible light sensor 180 may be configured to be more sensitive or less sensitive to movements in a first region of interest than in a second region of interest. For example, the first visible light sensor 180 may be configured to increase the sensitivity and apply a mask to focus on a region of interest around a keyboard of a computer to be more sensitive to movements around the keyboard. In other words, by using masks that focus on "smaller" vs "larger" portions (e.g., the keyboard vs. the desk surface on which the keyboard may sit), the first visible light sensor 180 may be configured to increase and/or decrease the sensitivity of detected or not detected movements. The sensitivity level may be adjusted based on size thresholds for the regions of interest, with relatively greater sensitivity to movement in smaller regions of interest. Through the use of masks, the first visible light sensor 180 may be configured to not simply detect movement in the space, but detect where that movement occurred.

The first visible light sensor 180 may transmit digital messages to the system controller 110 via the RF signals 108 (e.g., using the proprietary protocol) in response to detecting the occupancy or vacancy conditions. The system controller 110 may be configured to turn the lighting loads (e.g., lighting load 122 and/or the LED light source 132) on and off in response to receiving an occupied command and a vacant command, respectively. Alternatively, the first visible light sensor 180 may transmit digital messages directly to the lighting loads. The first visible light sensor 180 may operate as a vacancy sensor, such that the lighting loads are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The first visible light sensor 180 may be configured to operate in the daylight sensor mode to measure a light intensity at a location of the space. For example, the first visible light sensor 180 may apply a digital mask to focus on a specific location in the space (e.g., on a task surface, such as a table 106 as shown in FIG. 1) and may use a daylighting algorithm to measure the light intensity at the location. For example, the first visible light sensor 180 may be configured to apply a mask to focus on a region of interest that includes the surface of a desk. The first visible light sensor 180 may be configured to integrate light intensities values of the pixels of the image across the region of interest to determine a measured light intensity at the surface of the desk.

The first visible light sensor 180 may transmit digital messages (e.g., including the measured light intensity) to the system controller 110 via the RF signals 108 for controlling the intensities of the lighting load 122 and/or the LED light source 132 in response to the measured light intensity. The first visible light sensor 180 may be configured to focus on multiple regions of interest in the image recorded by the camera and measure the light intensity in each of the different regions of interest. Alternatively, the first visible light sensor 180 may transmit digital messages directly to the lighting loads. The first visible light sensor 180 may be configured to adjust certain operational characteristics (e.g., gain) based on the region of interest in which the light intensity is presently being measured. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The system controller 110 may be configured to determine a degradation in the light output of one or more of the lighting loads (e.g., the lighting load 122 and/or the LED light source 132) in the space, and to control the intensities of the lighting loads to compensate for the degradation (e.g., lumen maintenance). For example, the system controller 110 may be configured to individually turn on each lighting load (e.g., when it is dark at night) and measure the magnitude of the light intensity at a location (e.g., on the table 106 or the desk 220). For example, the system controller 110 may be configured to turn on the lighting load 122 at night and control the first visible light sensor 180 to record an image of the room, to apply a mask to focus on a region of interest that the lighting load 122 illuminates (e.g., the surface of table 106 or the desk 220), to measure the light intensity in that region of interest, and to communicate that value to the system controller 110. The system controller 110 may store this value as a baseline value. At a time and/or date thereafter, the system controller 110 may repeat the measurement and compare the measurement to the baseline value. If the system controller 110 determines there to be a degradation, such as by detecting that the degradation is greater than a threshold, it may control the lighting load 122 to compensate for the degradation, alert maintenance, etc.

The first visible light sensor 180 may be configured to operate in the color sensor mode to sense a color (e.g., measure a color temperature) of the light emitted by one or more of the lighting loads in the space (e.g., to operate as a color sensor and/or a color temperature sensor). For example, the first visible light sensor 180 may be configured to apply a mask to focus on a region of interest in the room 102 and may use a color sensing algorithm to determine a measured color and/or color temperature in the room. For example, the first visible light sensor 180 may integrate color values of the pixels of the image across the region of interest to determine the measured color and/or color temperature in the room. The first visible light sensor 180 may transmit digital messages (e.g., including the measured color temperature) to the system controller 110 via the RF signals 108 for controlling the color (e.g., the color temperatures) of the lighting load 122 and/or the LED light source 132 in response to the measured light intensity (e.g., color tuning of the light in the space). Alternatively, the first visible light sensor 180 may transmit digital messages directly to the lighting loads. An example of a load control system for controlling the color temperatures of one or more lighting loads is described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference.

The first visible light sensor 180 may be configured to operate in a glare detection sensor mode. For example, the first visible light sensor 180 may be configured execute a glare detection algorithm to determine a depth of direct sunlight penetration into the space from the image recorded by the camera. For example, the first visible light sensor 180 may be configured to apply a mask to focus on a region of interest on the floor of the room 102 near the windows 104 to sense the depth of direct sunlight penetration into the room. Based on a detection and/or measurement of the depth of direct sunlight penetration into the room, the first visible light sensor 180 may transmit digital messages to the system controller 110 via the RF signals 108 to limit the depth of direct sunlight penetration into the space, for example, to prevent direct sunlight from shining on a surface (e.g., a table or a desk). The system controller 110 may be configured to lower the window treatment fabric 152 of each of the motorized window treatments 150 to prevent the depth of direct sunlight penetration from exceeded a maximum sunlight penetration depth. Alternatively, the first visible light sensor 180 may be configured to directly control the window treatments 150 to lower of the window treatment fabric 152. Examples of methods for limiting the sunlight penetration depth in a space are described in greater detail in previously-referenced U.S. Pat. No. 8,288,981.

The first visible light sensor 180 may be configured to focus on daylight entering the space through, for example, one or both of the windows 104 (e.g., to operate as a window sensor). The system controller 110 may be configured to control the lighting loads (e.g., the lighting load 122 and/or the LED light source 132) in response to the magnitude of the daylight entering the space. The system controller 110 may be configured to override automatic control of the motorized window treatments 150, for example, in response to determining that it is a cloudy day or an extremely sunny day. Alternatively, the first visible light sensor 180 may be configured to directly control the window treatments 150 to lower of the window treatment fabric 152. Examples of load control systems having window sensors are described in greater detail in commonly-assigned U.S. Pat. No. 9,933,761, issued Apr. 3, 2018, entitled METHOD OF CONTROLLING A MOTORIZED WINDOW TREATMENT, the entire disclosure of which is hereby incorporated by reference.

The first visible light sensor 180 may be configured to detect a glare source (e.g., sunlight reflecting off of a surface) outside or inside the room 102 in response to the image recorded by the camera. The system controller 110 may be configured to lower the window treatment fabric 152 of each of the motorized window treatments 150 to eliminate the glare source. Alternatively, the first visible light sensor 180 may be configured to directly control the window treatments 150 to lower of the window treatment fabric 152 to eliminate the glare source.

The first visible light sensor 180 may also be configured to operate in the occupant count mode and may execute an occupant count algorithm to count the number of occupants a particular region of interest, and/or the number of occupants entering and/or exiting the region of interest. For example, the system controller 110 may be configured to control the HVAC system 162 in response to the number of occupants in the space. The system controller 110 may be configured to control one or more of the load control devices of the load control system 100 in response to the number of occupants in the space exceeding an occupancy number threshold. Alternatively, the first visible light sensor 180 may be configured to directly control the HVAC system 162 and other load control devices.

The second visible light sensor 182 may be configured to operate in a glare detection sensor mode. For example, the second visible light sensor 182 may be configured execute a glare detection algorithm to determine if a glare condition may exist in the room 102 from one or more images recorded by the camera. The glare condition in the room 102 may be generated by a glare source outside of the room, such as the sun, an external lamp (e.g., an outdoor building light or a streetlight), and/or a reflection of the sun or other bright light source. The second visible light sensor 182 may be configured to analyze one or more images recorded by the camera to determine if an absolute glare condition exists and/or a relative glare condition exists outside of the room 102 as viewed from one of the windows 104. An absolute glare condition may occur when the light level (e.g., the light intensity) of a potential glare source is too high (e.g., exceeds an absolute glare threshold). A relative glare condition (e.g., a contrast glare condition) may occur when the difference between the light level of a potential glare source and a background light level (e.g., a baseline) is too high (e.g., exceeds a relative glare threshold).

Based on a detection of a glare condition, the second visible light sensor 182 may transmit digital messages to the system controller 110 via the RF signals 108 to open, close, or adjust the position of the window treatment fabric 152 of each of the motorized window treatments 150. For example, the system controller 110 may be configured to lower the window treatment fabric 152 of each of the motorized window treatments 150 to prevent direct sunlight penetration onto a task surface in the room 102 (e.g., a desk or a table). If the second visible light sensor 182 does not detect a glare condition, the system controller 110 may be configured to open the motorized window treatments 150 (e.g., to control the position of the window treatment fabric 152 to a fully-open position or a visor position). Alternatively, the second visible light sensor 182 may be configured to directly control the window treatments 150.

The operation of the load control system 100 may be programmed and configured using, for example, the mobile device 190 or other network device (e.g., when the mobile device is a personal computing device). The mobile device 190 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the plug-in load control device 140, the motorized window treatments 150, and/or the thermostat 160). The load control database may comprise information regarding associations between the load control devices and the input devices (e.g., the remote control device 170, the visible light sensor 180, etc.). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No.

2008/0092075, published Apr. 17, 2008, entitled METHOD OF BUILDING A DATABASE OF A LIGHTING CONTROL SYSTEM; and U.S. Pat. No. 10,027,127, issued Jul. 7, 2017, entitled COMMISSIONING LOAD CONTROL SYSTEMS, the entire disclosures of which are hereby incorporated by reference.

The operation of the visible light sensors 180, 182 may be programmed and configured using the mobile device 190 or other network device. Each visible light sensor 180, 182 may comprise a second communication circuit for transmitting and receiving the RF signals 109 (e.g., directly with the network device 190 using a standard protocol, such as Wi-Fi or Bluetooth). During the configuration procedure of the load control system 100, the visible light sensors 180, 182 may each be configured to record an image of the space and transmit the image to the network device 190 (e.g., directly to the network device via the RF signals 109 using the standard protocol). The network device 190 may display the image on the visual display and a user may configure the operation of each visible light sensor 180, 182 to set one or more configuration parameters (e.g., configuration information) of the visible light sensor. For example, for different environmental characteristics to be sensed and controlled by the visible light sensors 180, 182 (e.g., occupant movements, light level inside of the room, daylight level outside of the room, etc.), the user may indicate different regions of interest on the image by tracing (such as with a finger or stylus) masked areas on the image displayed on the visual display. The visible light sensors 180, 182 may each be configured to establish different masks and/or operational characteristics depending upon the environmental characteristic to be sensed (e.g., occupant movements, light level inside of the room, daylight level outside of the room, color temperature, etc.).

After configuration of the visible light sensors 180, 182 is completed at the network device 190, the network device may transmit configuration information to the visible light sensors (e.g., directly to the visible light sensors via the RF signals 109 using the standard protocol). The visible light sensors 180, 182 may each store the configuration information in memory, such that the visible light sensors may operate appropriately during normal operation. For example, for each sensor event the visible light sensors 180, 182 are to monitor, the network device 190 may transmit to the respective visible light sensor the sensor mode for the event, one or more masks defining regions of interest for the event, possibly an indication of the algorithm to be used to sense the environmental characteristic of the event, and one or more operational characteristics for the event.

While the load control system 100 of FIG. 1 has been described above with reference to two visible light sensors 180, 182, the load control system 100 could also simply include either one of the visible light sensors 180, 182. For example, the load control system 100 may not include the first visible light sensor 180 and may include the second visible light sensor 182, which may be mounted to the window 104 and may operate to prevent sun glare from occurring on a task surface in the room 102. The load control system 100 may have more than two visible light sensors. Each window may have a respective visible light sensor, or a visible light sensor may receive an image through a window that is representative of a group of windows having motorized window treatments that are collectively controlled based on the image of a single visible light sensor.

Figure 2:
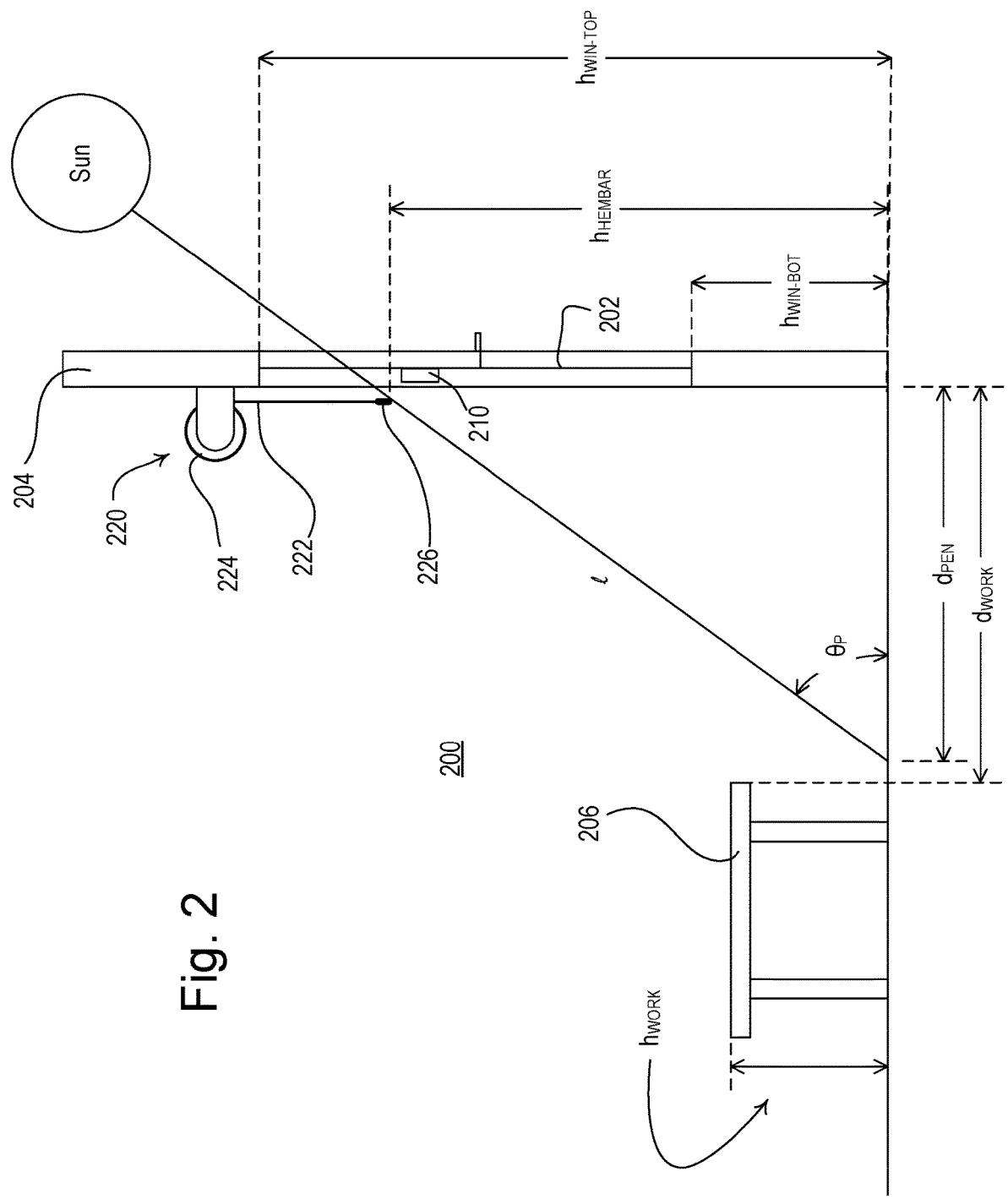
FIG. 2 is a side view of an example space having a visible light sensor.

FIG. 2 is a simplified side view of an example space 200 having a visible light sensor 210 (e.g., such as the second visible light sensor 182 of the load control system 100 shown in FIG. 1). The visible light sensor 210 may be mounted to a window 202, which may be located in a façade 204 of a building in which the space 200 is located and may allow light (e.g., sunlight) to enter the space. The visible light sensor 210 may be mounted to an inside surface of the window 202 (e.g., as shown in FIG. 2) or an outside surface of the window 202. The window 202 may be characterized by a height $h_{WIN\text{-}BOT}$ of the bottom of the window and a height $h_{WIN\text{-}TOP}$ of the top of the window. The space 200 may also comprise a work surface, e.g., a table 206, which may have a height $h_{WORK}$ and may be located at a distance $d_{WORK}$ from the window 202.

A motorized window treatment, such as a motorized roller shade 220 may be mounted over the window 202. The motorized roller shade 220 may comprise a roller tube 224 around which a shade fabric 222 may be wrapped. The shade fabric 222 may have a hembar 226 at the lower edge of the shade fabric that may be a height $h_{HEMBAR}$ above the floor. The motorized roller shade 220 may comprise a motor drive unit (not shown) that may be configured to rotate the roller tube 224 to move the shade fabric 222 between a fully-open position $P_{OPEN}$ (e.g., at which the window 202 is not covered and the hembar 226 may be at the top of the window) and a fully-closed position $P_{CLOSED}$ (e.g., at which the window 202 is fully covered and the hembar 226 may be at the bottom of the window). Further, the motor drive unit may control the position of the shade fabric 222 to one of a plurality of preset positions between the fully-open position and the fully-closed position.

A glare condition for an occupant of the room 200 may be caused by a glare source, such as the sun, an external lamp (e.g., an outdoor building light or a streetlight), or a reflection of the sun or other bright light source, that may be located outside of the window 202. For example, light from the glare source may shine through the window 202 into the room 200 and may extend into the room (e.g., onto the floor) for a penetration distance $d_{PEN}$ from the window 202 and/or from the façade 204. The penetration distance $d_{PEN}$ of the light may be measured in a direction normal to the window 202 and/or from the façade 204. The penetration distance $d_{PEN}$ of the light from the glare source may be a function of the height $h_{HEMBAR}$ of the hembar 226 of the motorized roller shade 220 and a profile angle $\theta_P$ of the glare source. The profile angle $\theta_P$ may represent the position of the glare source outside of the window 202. The position of the glare source may be defined by an altitude angle (e.g., a vertical angle) and an azimuth angle (e.g., a horizontal angle) from the center of view of the visible light sensor 210 (e.g., a direction perpendicular to the window 202 and/or the façade 204. The profile angle $\theta_P$ may be defined as an angle of a projection of the line from the glare source to the visible light sensor onto a vertical plane that is perpendicular to the window 202 and/or the façade 204. The penetration distance $d_{PEN}$ of light from the glare source onto the floor of the space 200 (e.g., in the direction normal to the window 202 and/or the façade 204) may be determined by considering a triangle formed by the penetration distance $d_{PEN}$, the height $h_{HEMBAR}$ of the hembar 226, and a length $\ell$ of the light shining into the space 200 in the normal direction to the window 202, as shown in the side view of the window 202 in FIG. 2, e.g., $$\tan(\theta_P) = h_{HEMBAR}/d_{PEN}. \qquad \text{(Equation 1)}$$

In response to the visible light sensor 210 detecting a glare source outside of the window 202, the visible light sensor 210 and/or a system controller (e.g., the system controller 110) may be configured to determine a position to which to control the shade fabric 224 (e.g., the hembar 226 of the shade fabric 224) of the motorized roller shade 220 to prevent a glare condition in the space. For example, the position of the hembar 226 of the motorized roller shade 220 may be adjusted to prevent the penetration distance $d_{PEN}$ from exceeding a maximum penetration distance $d_{PEN-MAX}$. For example, if the sun is shining in the window 220, the visible light sensor 210 may be configured to process the image to determine the profile angle $\theta_S$ that defines the location of the glare source. The visible light sensor 210 and/or the system controller may be configured to calculate the desired height $h_{HEMBAR}$ above the floor to which to control the hembar 226 to prevent the light from the glare source from exceeding the maximum penetration distance $d_{PEN-MAX}$, e.g., $$h_{HEMBAR} = \tan(\theta_P) \cdot d_{PEN-MAX}. \quad \text{(Equation 2)}$$

The visible light sensor 210 and/or the system controller may be configured with values for the top and bottom heights $h_{WIN-TOP}$, $h_{WIN-BOT}$ of the window 220, e.g., during configuration of the visible light sensor and/or the system controller. The visible light sensor 210 and/or the system controller may be configured to determine a desired position of the hembar 226 between the fully-open position $P_{OPEN}$ and the fully-closed position $P_{CLOSED}$ of the motorized roller shade 220 using the top and bottom heights $h_{WIN-TOP}$, $h_{WIN-BOT}$ and the calculated height $h_{HEMBAR}$ of the hembar.

The position of the hembar 226 of the motorized roller shade 220 may be adjusted to prevent light from the glare source from shining on the table 206. For example, the visible light sensor 210 and/or the system controller may be configured to calculate the desired height $h_{HEMBAR}$ above the floor to which to control the hembar 226 to prevent the light from the glare source from shining on the table 206, e.g., $$h_{HEMBAR} = (\tan(\theta_P) \cdot d_{WORK}) + h_{WORK}. \quad \text{(Equation 3)}$$

The position of the hembar 226 of the motorized roller shade 220 may be adjusted to prevent light from the glare source from shining in the eyes of occupants of the space 200. For example, the visible light sensor 210 and/or the system controller may be configured to calculate the desired height $h_{HEMBAR}$ above the floor to which to control the hembar 226 based on an estimated height of the occupant's eyes and/or an estimated distance of the occupants from the window. For example, if the room 200 includes a visible light sensor located within the room (e.g., as the visible light sensor 180 of the load control system 100 of FIG. 1), that visible light sensor may be configured to process an image of the room to determine the values for the height of the occupant's eyes and/or the distance of the occupants from the window.

The visible light sensor 210 and/or the system controller may store values for the maximum penetration distance $d_{PEN-MAX}$, the height $h_{WORK}$ of the table 206, and the distance $d_{WORK}$ of the table 206 from the window 202. For example, the visible light sensor 210 and/or the system controller may be configured with these values during the configuration of the visible light sensor 210 and/or the system controller (e.g., using the mobile device 190 or other network device). Additionally, or alternatively, the visible light sensor 206 and/or the system controller may be configured with default values for the maximum penetration distance $d_{PEN-MAX}$, the height $h_{WORK}$ of the table 206, and the distance $d_{WORK}$ of the table 206 from the window 202. For example, if the room 200 includes a visible light sensor located within the room (e.g., as the visible light sensor 180 of the load control system 100 of FIG. 1), that visible light sensor may be configured to process an image of the room to determine the values for the maximum penetration distance $d_{PEN-MAX}$, the height $h_{WORK}$ of the table 206, and the distance $d_{WORK}$ of the table 206 from the window 202, and transmit those values to the visible light sensor 210 on the window 202 and/or the system controller.

Figure 3:
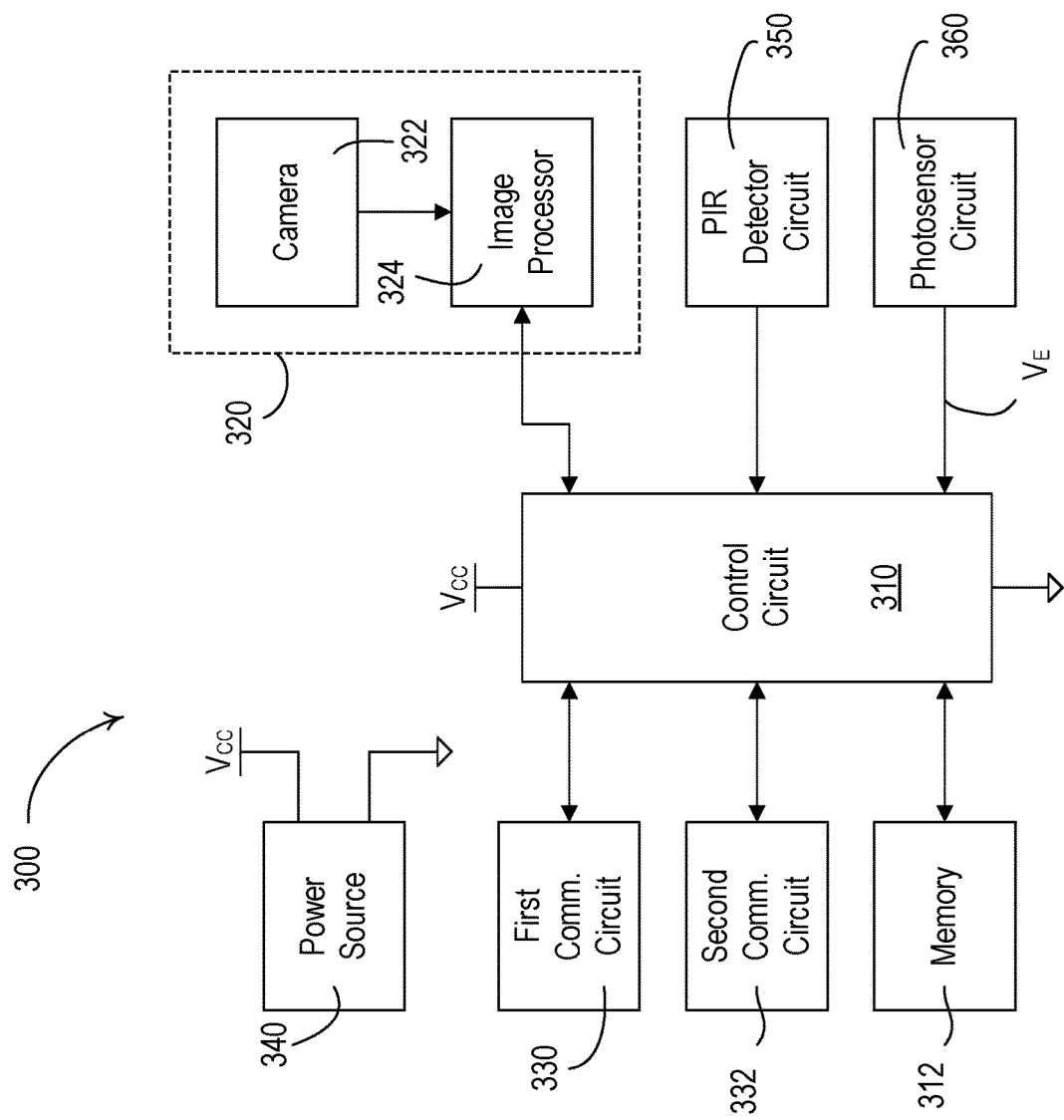
FIG. 3 is a block diagram of an example visible light sensor.

FIG. 3 is a simplified block diagram of an example visible light sensor 300, which may be deployed as one or both of the visible light sensors 180, 182 of the load control system 100 shown in FIG. 1 and/or the visible light sensor 210 of FIG. 2. The visible light sensor 300 may comprise a control circuit 310, for example, a microprocessor, a programmable logic device (PLD), a microcontroller, an application specific integrated circuit (ASIC), a field-programmable gate array (FPGA), or any suitable processing device. The control circuit 310 may be coupled to a memory 312 for storage of sensor events, masks, operational characteristics, etc. of the visible light sensor 300. The memory 312 may be implemented as an external integrated circuit (IC) or as an internal circuit of the control circuit 310.

The visible light sensor 300 may comprise a visible light sensing circuit 320 having an image recording circuit, such as a camera 322, and an image processing circuit, such as an image processor 324. The image processor 324 may comprise a digital signal processor (DSP), a microprocessor, a programmable logic device (PLD), a microcontroller, an application specific integrated circuit (ASIC), a field-programmable gate array (FPGA), or any suitable processing device. The camera 322 may be positioned towards a space in which one or more environmental characteristics are to be sensed in a space (e.g., into the room 102). The camera 322 may be configured to capture or record an image. For example, the image may be a low-dynamic-range (LDR) image. The LDR image may be characterized by a particular exposure time (e.g., a shutter speed, i.e., how long the shutter of the camera is open to record the image). In addition, the image may be a high-dynamic-range (HDR) image, which may be a composite of multiple LDR images (e.g., six LDR images) recorded by the camera 322 with different exposure times and combined together by the image processor 324. The control circuit 310 may also receive multiple LDR images from the visible light sensing circuit 320 and combine the LDR images together to form an HDR image. Recording and/or generating an HDR image may require more processing resources and/or may result in an increased power consumption as compared to recording an LDR image.

For example, the camera 322 may be configured to capture images at a particular sampling rate, where a single image may be referred to as a frame acquisition. One example frame acquisition rate is approximately ten frames per second. The frame acquisition rate may be limited to reduce the required processing power of the visible light sensor 300. Each image may consist of an array of pixels, where each pixel has one or more values associated with it. A raw RGB image may have three values for each pixel: one value for each of the red, green, and blue intensities, respectively. One implementation may use the existing RGB system for pixel colors, where each component of the intensity has a value from 0-255. For example, a red pixel would have an RGB value of (255, 0, 0), whereas a blue pixel would have an RGB value of (0, 0, 255). Any given pixel that is detected to be a combination of red, green, and/or blue may be some combination of (0-255, 0-255, 0-255). Over representations for an image may be used.

The camera 322 may provide the captured image (e.g., a raw image) to the image processor 324. The image processor 324 may be configured to process the image and provide to the control circuit 310 one or more sense signals that are representative of the sensed environmental characteristics (e.g., an occurrence of movement, an amount of movement, a direction of movement, a velocity of movement, a counted number of occupants, a light intensity, a light color, an amount of direct sunlight penetration, etc.). For example, the one or more sense signals provided to the control circuit 310 may be representative of movement in the space and/or a measured light level in the space.

The image processor 324 may provide a raw image or a processed (e.g., preprocessed) image to the control circuit 310, which may be configured to process the image to determine sensed environmental characteristics. Regardless, the control circuit 310 may then use the sensed environmental characteristics to transmit control commands to load devices (e.g., directly or through system controller 110).

One example of a processed image, as is known in the art, is the luminance of a pixel, which may be measured from the image RGB by adding R, G, B intensity values, weighted according to the following formula:

$$\text{Luminance (perceived)} = (0.299*R + 0.587*G + 0.114*B). \quad \text{(Equation 4)}$$

The example weighting coefficients may factor in the non-uniform response of the human eye to different wavelengths of light. However, other coefficients may alternatively be used.

As previously mentioned, if the visible light sensor 300 has a fish-eye lens, the image captured by the camera 322 may be warped. The image processor 324 may be configured to preprocess the image to de-warp the image and to generate a non-warped image.

Another image processing technique may include mapping the RGB sensor response to CIE tristimulus values to acquire chromaticity coordinates and thereby the Correlated Color Temperature (CCT). An example method is described by Joe Smith in the following reference: *Calculating Color Temperature and Illuminance using the TAOS TCS3414CS Digital Color Sensor, Intelligent Opto Sensor Designer's Notebook*, Feb. 27, 2009. Another example of a processed image may be an image to which a digital filter, or a digital mask has been applied. A digital mask may be used to eliminate regions within the image, which may not have value for further analysis and processing. Alternatively, a complement of a digital mask may be a region of interest (e.g., an area within an image that has been identified for further processing or analysis). A processed image may also be created via a technique known as background subtraction. For example, using background subtraction, a background image, which may incorporate the history of the image over time (e.g., the previous state of the room), may be subtracted from the current image (e.g., the current state of the room). This technique may identify differences in the images. Background subtraction may be useful for detecting movement in an image and for occupancy and vacancy detection. Various algorithms may be used for background maintenance, to determine how to effectively combine pixels over time into the background image. Some example background maintenance algorithms may include: adjusted frame difference, mean and threshold, mean and covariance, mixture of Gaussians, and/or normalized block correlation. These and other similar details inherent to image processing would be familiar to one skilled in the art.

The control circuit 310 and/or the image processor 324 may be configured to apply one or more masks to focus on one or more regions of interest in the image (e.g., the raw image and/or the preprocessed image) to sense one or more environmental characteristics of the space. As used herein, a mask may be any definition to define a region of interest of an image. For example, assuming an image may be defined as an N×M array of pixels where each pixel has a defined coordinate/position in the array, a mask be defined as a sequence of pixel coordinates that define the outer perimeter of a region of interest within the image. As another example, a mask may be defined as an N×M array that corresponds to the N×M array of pixels of an image. Each entry of the mask may be a 1 or 0, for example, whereby entries having a 1 may define the region of interest. Such a representation may allow an image array and a mask array to be "ANDED," which may cancel or zero out each pixel of the image that are not of interest. Rather than a mask defining the region of interest of the image, a mask may define the region that is not of interest. These are merely examples and other representations may be used.

The visible light sensor 300 may comprise a first communication circuit 330 configured to transmit and receive digital messages via a first communication link using a first protocol. For example, the first communication link may comprise a wireless communication link and the first communication circuit 330 may comprise an RF transceiver coupled to an antenna. In addition, the first communication link may comprise a wired digital communication link and the first communication circuit 330 may comprise a wired communication circuit. The first protocol may comprise a proprietary protocol, such as the ClearConnect protocol, or another protocol, such as the Zigbee® protocol, Thread® protocol, or another wireless protocol. The control circuit 310 may be configured to transmit and receive digital messages via the first communication link during normal operation of the visible light sensor 300. The control circuit 310 may be configured to transmit an indication of the sensed environmental characteristic via the first communication link during normal operation of the visible light sensor 300. For example, the control circuit 310 may be configured to transmit an indication of a detected state (e.g., an occupancy or vacancy condition) and/or a measured environmental characteristic (e.g., a measured light level or illuminance) via the first communication link during normal operation of the visible light sensor 300.

The visible light sensor 300 may comprise a second communication circuit 332 configured to transmit and receive digital messages via a second communication link using a second protocol. For example, the second communication link may comprise a wireless communication link and the second communication circuit 332 may comprise an RF transceiver coupled to an antenna. In addition, the second communication link may comprise a wired digital communication link and the second communication circuit 332 may comprise a wired communication circuit. The second protocol may comprise a standard protocol, such as, for example, the Wi-Fi protocol, the Bluetooth protocol, the Zigbee protocol, etc. The control circuit 310 may be configured to transmit and receive digital messages via the second communication link during configuration of the visible light sensor 300. For example, the control circuit 310 may be configured to transmit an image recorded by the camera 322 via the second communication link during configuration of the visible light sensor 300.

The visible light sensor 300 may comprise a power source 340 for producing a DC supply voltage $V_{CC}$ for powering the control circuit 310, the memory 312, the image processor 324, the first and second communication circuits 330, 332, and/or other low-voltage circuitry of the visible light sensor 300. The power source 340 may comprise a power supply configured to receive an external supply voltage from an external power source (e.g., an AC mains line voltage power source and/or an external DC power supply). The power source 340 may comprise a battery for powering the circuitry of the visible light sensor 300.

The visible light sensor 300 may further comprise a low-power occupancy sensing circuit, such as a passive infrared (PIR) detector circuit 350. The PIR detector circuit 350 may generate a PIR detect signal $V_{PIR}$ (e.g., a low-power occupancy signal) that is representative of an occupancy and/or vacancy condition in the space in response to detected passive infrared energy in the space. The PIR detector circuit 350 may consume less power than the visible light sensing circuit 320 consumes (e.g., in order to detect an occupancy and/or vacancy condition in the space). However, the visible light sensing circuit 320 may be more accurate than the PIR detector circuit 350. For example, when the power source 340 is a battery, the control circuit 310 may be configured to disable the visible light sensing circuit 320 and use the PIR detector circuit 350 to detect occupancy conditions. The control circuit 310 may disable the visible light sensing circuit 320, for example, when the space is vacant. The control circuit 310 may detect an occupancy condition in the space in response to the PIR detect signal $V_{PIR}$ and may subsequently enable the visible light sensing circuit 320 to detect a continued occupancy condition and/or a vacancy condition. The control circuit 310 may enable the visible light sensing circuit 320 immediately after detecting an occupancy condition in the space in response to the PIR detect signal $V_{PIR}$. The control circuit 310 may keep the visible light sensing circuit 320 disabled after detecting an occupancy condition in the space (in response to the PIR detect signal $V_{PIR}$). The control circuit 310 may keep the visible light sensing circuit 320 disabled until the PIR detect signal $V_{PIR}$ indicates that the space is vacant. The control circuit 310 may not make a determination that the space is vacant until the visible light sensing circuit 320 subsequently indicates that the space is vacant.

When the visible light sensor 300 is mounted to a window (e.g., as the second visible light sensor 182 of the load control system of FIG. 1), the control circuit 310 may be configured to record one or more images of the space outside of the window via the camera 322 and process the one or more images to determine if a glare condition exists. The visible light sensor 300 may comprise a fish-eye lens (not shown), which may cause the images recorded by the camera 322 to be warped. The control circuit 310 and/or the image processor 324 may be configured to de-warp the images recorded by the camera 322 to produce non-warped images, which may be characterized by rows of constant profile angle.

The control circuit 310 may be configured to process each pixel of the non-warped images to determine if a glare conditions exists for each pixel. For example, the control circuit 310 may determine a luminance $L_{PI}$ of each pixel of the non-warped images to determine if a glare conditions exists for each pixel. The control circuit 310 may begin processing the image at a portion of the image which may be relative to a position on a window or group of windows from which the image is taken. For example, the portion of the image may represent a bottom portion of the window and the control circuit may begin processing the non-warped image at the bottom portion. The bottom portion may include a predefined number of pixel rows from the bottom of the image (e.g., a bottom row of pixels in the non-warped image). The control circuit may also, or alternatively, begin processing the image from a top portion (e.g., a top row of pixels) of the image. The portion of the image that is processed first may depend on the direction from which the motorized window treatment moves the covering material to close the covering material and/or the current position of the covering material to reduce the processing resources utilized to identify a glare condition in the image.

The control circuit 310 may be configured to start at the bottom row of pixels of the non-warped image (e.g., at the left or right side). The control circuit 310 may step through each pixel in the bottom row and process each pixel to determine if a glare condition exists before moving up to the next row. After the control circuit 310 determines that a glare condition exists, the control circuit 310 may stop processing the non-warped image and may operate to control one or more motorized window treatments (e.g., such as the motorized window treatments 140 of FIG. 1 and/or the motorized roller shade 220 of FIG. 2) to remove the glare condition (e.g., as will be described in greater detail below). This may prevent the rest of the image from being processed to detect the glare condition. And if the control circuit 310 determines that a glare condition exists, the control circuit 310 may transmit control instruction to operate the window shades of the one or more motorized window treatments to transition to a position that removes the glare condition. If, however, the control circuit 310 processes the entire image without detecting a glare condition, the control circuit may conclude that no glare conditions exist and may control the motorized window treatment to open. Since the control circuit 310 processes the pixels of the non-warped image starting at the bottom row of the non-warped image, the control circuit 310 may find the lowest pixel that indicates a glare source before detecting other higher glare sources. The lowest pixel that indicates a glare source is an important parameter for determining the shade position to which to control the motorized window treatments to prevent glare on the task surface. This allows the control circuit 310 to minimize the amount of processing that is needed to determine the shade control command to prevent glare in the room.

When processing the non-warped images to determine if a glare condition exists, the control circuit 310 may be configured to determine if an absolute glare condition exists and/or a relative glare condition (e.g., a contrast glare condition) exists. The control circuit 310 may be configured to determine that an absolute glare condition exists if an absolute light level (e.g., absolute intensity or illuminance) of a pixel exceeds an absolute glare threshold (e.g., approximately 10,000 cd/m$^2$). The control circuit 310 may be configured to determine that a relative glare condition exists if a relative light level as compared to a background light level (e.g., the difference between the absolute light level of the pixel and a background light level) exceeds a relative glare threshold (e.g., approximately 4,000 cd/m$^2$). If the control circuit 310 detects that either an absolute glare condition exists or a relative glare condition exists, the control circuit may stop processing the non-warped image and move to control the motorized window treatment(s) to remove the glare condition. For example, the motorized window treatments(s) may remove the glare condition by determining a shade position based on the location of the glare condition. The thresholds may be adjustable to adjust a sensitivity of the visible light sensor 300. For example, the thresholds may be adjusted by a user during configuration of the visible light sensor 300.

To determine if a relative glare condition exists, the control circuit 310 may determine a background light level from the non-warped image (e.g., a baseline). The background light level may be a value representative of a luminance of the background of the non-warped image. For example, the background light level may be a percentile luminance of the non-warped image (e.g., a $25^{th}$ percentile luminance $L_{25}$). The $25^{th}$ percentile luminance $L_{25}$ may be a luminance, where 25% of the pixels of the non-warped image are darker than the $25^{th}$ percentile luminance. The control circuit 310 may calculate a contrast ratio $C_{PI}$ for a pixel of a recorded image based on the luminance $L_{PI}$ of the pixel and the $25^{th}$ percentile luminance $L_{25}$ (e.g., $C_{PI}=L_{PI}/L_{25}$). If the contrast ratio $C_{PI}$ is greater than a contrast threshold $C_{TH}$ (e.g., approximately 15), the control circuit 310 may determine that a glare condition is present (e.g., a relative glare condition).

When the control circuit 310 has determined that a glare condition exists, the control circuit 310 may process the pixel to determine a profile angle of the glare source. For example, each pixel of the image may be characterized by a value of the profile angle. The values for the profile angle may be stored in the memory 312. The control circuit 310 may retrieve the appropriate profile angle based on the processed pixel. In addition, the profile angle may be determined and/or calculated from the data of the image. The control circuit 310 may determine a position to which to control the motorized window treatments using the profile angle (e.g., as shown in Equations 2 and/or 3 above). The control circuit 310 may transmit the profile angle to another device (e.g., the system controller 110), which may determine a position to which to control the motorized window treatments to avoid a glare condition in the room.

The visible light sensor 300 may further comprise a low-power photo sensing circuit, such as a photosensor circuit 360. The photosensor circuit 360 may comprise a photosensitive diode (not shown). The visible light sensor 300 may comprise a lens (not shown) for directing light (e.g., daylight or sunlight) from outside of the visible light sensor 300 onto the photosensitive diode. For example, the photosensor circuit 360 may be configured to determine an average illuminance (e.g., an average light level) of the light shining on the lens of the visible light sensor 300. The photosensor circuit 360 may consume less power than the visible light sensing circuit 320 consumes (e.g., in order to measure the average illuminance of the light shining on the visible light sensor). The photosensor circuit 360 may be configured to generate an illuminance signal $V_E$ (e.g., a low-power daylight signal) that may indicate the average illuminance of the light shining on the photosensitive diode. The control circuit 310 may be configured to periodically sample the illuminance signal $V_E$ at a photosensor (PS) rate. The PS rate may be a heartbeat rate that occurs at regular intervals.

As described herein, the visible light sensor 300 may be powered by a finite power source (e.g., the power source 304 may be a battery) and may have limited power storage. In addition, the visible light sensor 300 may have limited memory resources and/or processing resources. The image processing performed by the visible light sensing circuit 320 and/or the control circuit 310 may cause the visible light sensor 310 to consume a greater amount of power storage, memory resources, and/or processing resources on the visible light sensor than when performing other computer processing techniques. Reducing the amount of image processing performed by the visible light sensing circuit 320 and/or the control circuit 310 may reduce the amount of power and/or resources used on the visible light sensor 300.

When the power source 340 is a battery, the control circuit 310 may be configured to disable the visible light sensing circuit 320 and use the photosensor circuit 360 to measure the average illuminance of the light outside of the room. The control circuit 310 may disable the visible light sensing circuit 320, for example, when the average illuminance measured by the photosensor circuit 360 is below an illuminance threshold $E_{TH}$ and/or when the average illuminance is not changing much (e.g., a change $\Delta E$ in the illuminance is less than an illuminance change threshold $\Delta E_{TH}$). For example, the change $\Delta E$ in the illuminance may be the difference between a present illuminance $E_{PRES}$ and a previous illuminance $E_{PREV}$ as measured by the photosensor circuit 360. In response to detecting that the average illuminance measured by the photosensor circuit 360 is above the illuminance threshold $E_{TH}$ and/or the change $\Delta E$ in the illuminance (e.g., an increase in the illuminance) is greater than the illuminance change threshold $\Delta E_{TH}$, the control circuit 310 may be configured to enable (e.g., wake up) the visible light sensing circuit 320, such that the control circuit is able to determine the position (e.g., the profile angle) of a potential glare source from an image captured by the visible light sensing circuit and approximately control the motorized window treatment using the profile angle.

The control circuit 310 may be configured to periodically enable the visible light sensing circuit 320 at an image processing (IP) rate. The IP rate may be a heartbeat rate that occurs at regular intervals. The control circuit 310 may be configured to adjust the IP rate in response to the present illuminance $E_{PRES}$ and/or a change $\Delta E$ in the illuminance (e.g., as determined from the illuminance signal $V_E$), for example, to conserve power, processing resources, and/or memory resources. For example, the control circuit 310 may adjust (e.g., decrease) the IP rate when the sun is positioned such that glare conditions are less likely to occur. For example, the control circuit may decrease the IP rate at times when the daylight intensity level is lower (e.g., when the sun is behind clouds or at night when detecting a glare condition is unlikely), which may decrease the amount of image processing that is performed on the visible light sensor 300. The control circuit 310 may increase the IP rate at times when the daylight intensity level is higher (e.g., during a sunny day when detecting a glare condition is more likely). If the IP rate is reduced when glare conditions are less likely to be detected (e.g., when the sun is behind clouds or at night), the visible light sensor 300 may reduce the amount of image processing that is performed during these times.

The control circuit 310 may be configured to adjust the operation of the visible light sensing circuit 320 in response to the present illuminance $E_{PRES}$. For example, the control circuit 310 may be configured to adjust the exposure time that is used by the camera 322 to record an image (e.g., an LDR image). The control circuit 310 may be configured to use the present illuminance $E_{PRES}$ to determine the appropriate exposure time to use to record a single image that may indicate the position (e.g., the profile angle) of the glare source (e.g., such that the visible light sensing circuit 320 and/or the control circuit 310 does not need to generate an HDR image). The control circuit 310 may record images at different exposure times to detect the location (e.g., the profile angle) of a glare source due to different types of glare conditions (e.g., smaller glare conditions, larger glare conditions, absolute glare conditions and/or relative glare conditions). For example, if the glare condition is an absolute glare condition, the control circuit 310 may be configured to use an absolute exposure time $T_{EXP-A}$ to detect the location of the glare source. The absolute exposure time $T_{EXP-A}$ may be a fixed exposure time (e.g., a minimum exposure time) at which the location of a glare source due to absolute glare conditions may be detected in an LDR image (e.g., a single LDR image). If the glare condition is relative glare condition (e.g., a contrast glare condition), the control circuit 310 may be configured to use a contrast-based exposure time $T_{EXP-C}$ to detect the location of the glare source. The contrast-based exposure time $T_{EXP-C}$ may be a variable exposure time at which the location of a glare source due to contrast glare conditions may be detected in an LDR image (e.g., a single LDR image). The contrast-based exposure time $T_{EXP-C}$ may have a value that is dependent upon the present illuminance $E_{PRES}$ (e.g., as determined from the illuminance signal $V_E$).

Figure 4:
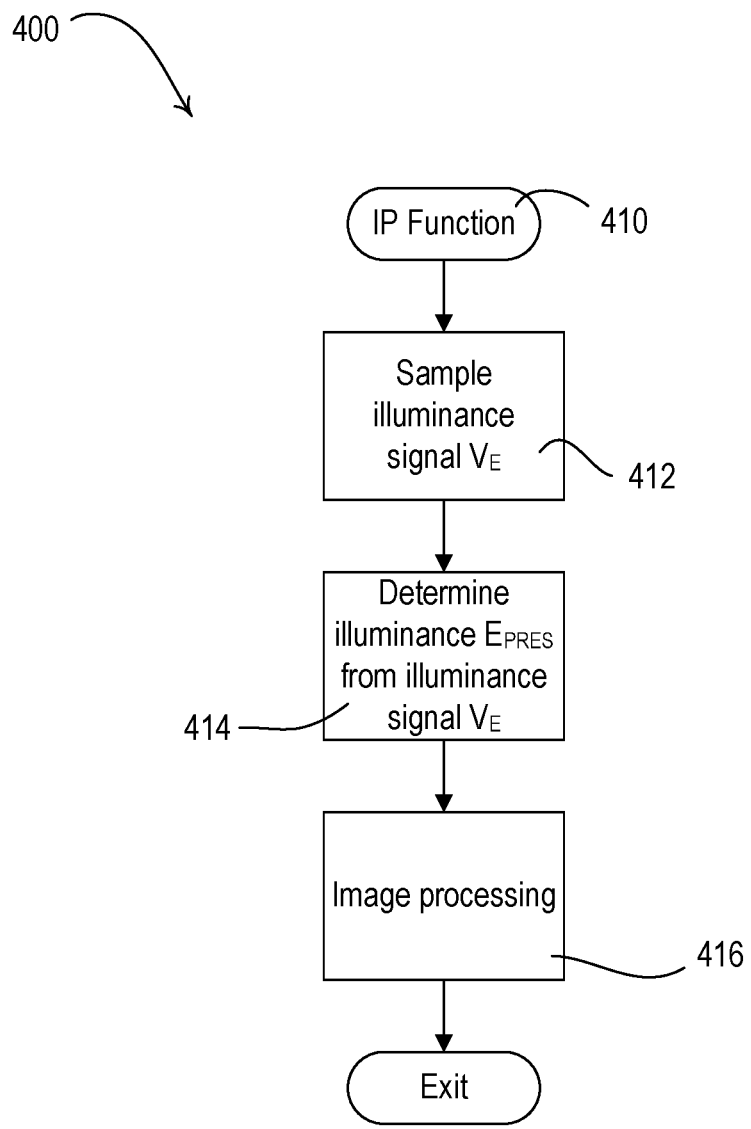
FIG. 4 shows an exemplary flowchart of a procedure for dynamically determining an image processing rate that may be executed by a control circuit of a visible light sensor.

FIG. 4 is an example of a procedure 400 that may be executed by a control circuit of a visible light sensor (e.g., the control circuit 310 and/or the image processor 322 of the visible light sensor 300) to detect a glare condition. For example, the procedure 400 may be periodically triggered by an image processing (IP) function at an IP rate. The IP rate may be dynamically adjusted (e.g., as will be described in greater detail below with reference to FIG. 5), which may decrease and/or increase the frequency of triggering of the procedure 400 by the IP function. The procedure 400 may also be performed by a control circuit of one or more other devices, such as a system controller (e.g., the system controller 110 shown in FIG. 1). For example, the visible light sensor and/or system controller may include a visible light sensing circuit (e.g., the visible light sensing circuit 320) and a photosensor circuit (e.g., the photosensor circuit 360), which may be capable of measuring a present illuminance $E_{PRES}$ of light shining on the visible light sensor.

As illustrated in FIG. 4, the procedure 400 may be triggered by an IP function at 410 (e.g., at the IP rate). At 412, the control circuit may sample an illuminance signal $V_E$ that may be generated by the photosensor circuit. At 414, the control circuit may determine a present illuminance $E_{PRES}$ based on the magnitude of the illuminance signal $V_E$. At 416, the control circuit may process the image. For example, the control circuit may process the image to detect glare conditions (e.g., as will be described in greater detail below with reference to FIG. 7 and/or FIG. 8). If, for example, a glare condition is detected, the control circuit may also remove the glare condition. For example, as described herein, the control circuit may determine a shade position of a motorized window treatment (e.g., motorized roller shade 220) to remove the glare condition. In addition, the control circuit may transmit control instructions to the motorized window treatment that transitions the shade fabric of the motorized window treatment (e.g., shade fabric 224) to the determined shade positions to remove the detected glare condition.

Figure 5:
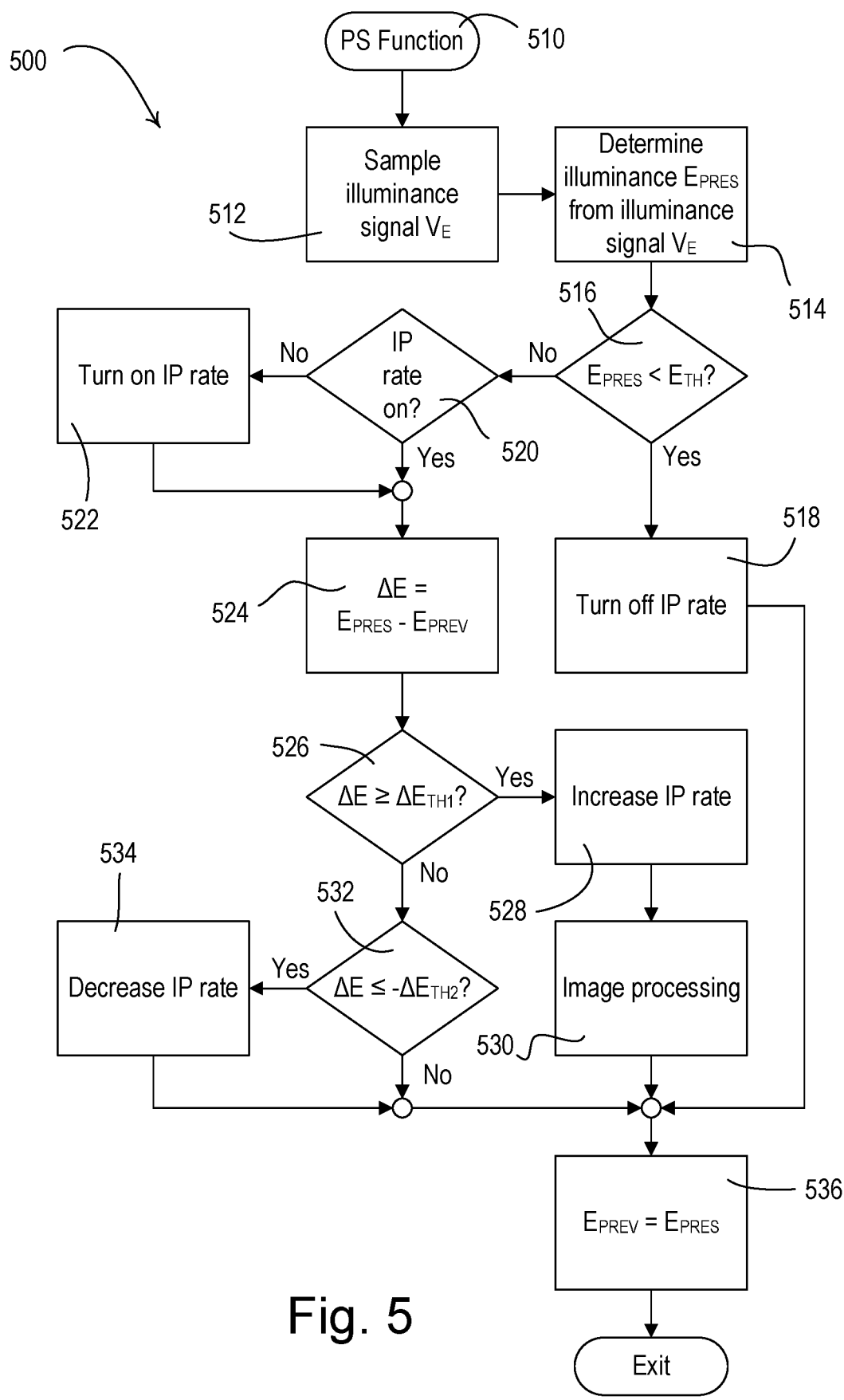
FIG. 5 shows an exemplary flowchart of an image processing procedure that may be executed by a control circuit of a visible light sensor.

FIG. 5 is an example of a procedure 500 that may be executed by a control circuit of a visible light sensor (e.g., the control circuit 310 and/or the image processor 322 of the visible light sensor 300) for dynamically adjusting an IP rate of an IP function. As described herein, the IP function may trigger the procedure 400 shown in FIG. 4, which may include image processing for performing glare detection. For example, glare detection may be performed by waking up a visible light sensor circuit at the IP rate to perform image processing on one or more images. The procedure 500 may also be performed by a control circuit of or one or more other devices, such as a system controller (e.g., system controller 110 shown in FIG. 1). For example, the procedure 500 may be performed at the visible light sensor, the system controller, or may be distributed across multiple devices, such as the visible light sensor and the system controller. The visible light sensor may include a visible light sensing circuit (e.g., the visible light sensing circuit 320) and a photosensor circuit (e.g., the photosensor circuit 360), which may be capable of measuring a present illuminance $E_{PRES}$ of light shining on the visible light sensor.

As illustrated in FIG. 5, the procedure 500 may be triggered by a photo sensing (PS) function at 510 (e.g., at a PS rate). For example, and as described herein, the PS function may be periodically triggered (e.g., at the PS rate) to determine the likelihood of detecting glare conditions and/or adjust the IP rate accordingly (e.g., based on an illuminance signal). The PS rate may be a higher rate than the IP rate (e.g., such that the procedure 500 is triggered more frequently than the procedure 400 shown in FIG. 4). In addition, the processing periodically triggered at the PS rate may be less intensive (e.g., consume less processing and/or power resources) that the processing periodically triggered at the IP rate. At 512, the control circuit may sample an illuminance signal $V_E$ that may be generated by the photosensor circuit. The illuminance signal $V_E$ may be used to determine the likelihood of detecting glare conditions.

At 514, the control circuit may determine a present illuminance $E_{PRES}$ based on the magnitude of the illuminance signal $V_E$. The present illuminance $E_{PRES}$ may be used to indicate the likelihood of detecting a glare condition. For example, a value of the present illuminance $E_{PRES}$ that is above an illuminance threshold $E_{TH}$ may indicate that the sun is positioned such that glare conditions may be more likely to exist (e.g., that it is daytime and the sun is not covered by a cloud, a building, etc.). A value of the present illuminance $E_{PRES}$ that is below the illuminance threshold $E_{TH}$ may indicate the sun is positioned such that a glare condition is less likely to exist (e.g., it is nighttime or the sun is covered by a cloud, a building, etc.). At 516, the control circuit may compare the present illuminance $E_{PRES}$ to an illuminance threshold $E_{TH}$ (e.g., to determine whether it is nighttime and/or detecting a glare condition is unlikely). If the present illuminance $E_{PRES}$ is less than the illuminance threshold $E_{TH}$, the control circuit may turn off IP rate (e.g., adjust the IP rate to zero) at 518. As described herein, the IP rate may be turned off when a glare condition is unlikely to exist. As shown in FIG. 5, and further described herein, the control circuit may cease recording and/or processing images while the IP rate is turned off, which may also decrease power consumption.

As described herein, the procedure 500 may dynamically adjust the IP rate when a glare condition is unlikely to exist. Accordingly, if, at 516, the present illuminance $E_{PRES}$ is not less than the illuminance threshold $E_{TH}$ (e.g., indicating that the sun is positioned such that a glare condition may be detected), the control circuit may determine whether the IP rate is on (e.g., the IP rate is greater than zero) at 520. If the IP rate is off, the control circuit may turn on the IP rate at 522. At 524, after determining whether the IP rate is turned on at 520 and/or turning on the IP rate at 522, the control circuit may determine (e.g., calculate) a change ΔE in illuminance. For example, the change ΔE in illuminance may include the difference between the present illuminance $E_{PRES}$ and a previous illuminance $E_{PREV}$. The previous illuminance may include an illuminance determined at 514 and/or stored at 532 during a previous invocation of the procedure 500.

The change ΔE in illuminance calculated at 524 may be used to predict the existence of or likelihood of detecting a glare condition. For example, a value of the change ΔE in illuminance above an illuminance threshold may indicate that the sun is positioned such that a glare condition may be more likely (e.g., because the sun may be moving out from behind a building or a cloud). At 526, the device may compare the change ΔE in illuminance to a first illuminance change threshold $\Delta E_{TH1}$. For example, the first illuminance change threshold $\Delta E_{TH1}$ may be a fixed value or a variable value that may be determined as a function of the present illuminance $E_{PRES}$, e.g., $\Delta E_{TH1}=\alpha \cdot E_{PRES}$, where $\alpha$ is a predetermined constant, such as 0.10 or 10%. If the change $\Delta E$ (e.g., an increase) in illuminance is greater than or equal to the first illuminance change threshold $\Delta E_{TH1}$ (e.g., indicating that the sun is positioned such that detecting a glare condition may be more likely), the control circuit may adjust (e.g., increase) the IP rate at 528. The control circuit may adjust the IP rate based on, for example, the present illuminance $E_{PRES}$, the change $\Delta E$ in illuminance, and/or the likelihood of detecting a glare condition. For example, the control circuit may increase the IP rate when the present illuminance $E_{PRES}$ and/or the change $\Delta E$ in illuminance is large, and decrease the IP rate when the present illuminance $E_{PRES}$ and/or the change $\Delta E$ in illuminance is small. At 530, the control circuit may process the image, e.g., to capture one or more images and/or detect glare conditions. If, for example, a glare condition is detected, the control circuit may also remove the glare condition. For example, as described herein, the control circuit may determine a shade position of a motorized window treatment (e.g., motorized roller shade 220) to remove the glare condition. In addition, the control circuit may transmit control instructions to the motorized window treatment that transitions the shade fabric of the motorized window treatment (e.g., shade fabric 224) to the determined shade positions to remove the detected glare condition.

At 532, the device may compare the change $\Delta E$ in illuminance to a second illuminance change threshold $-\Delta E_{TH2}$. If the change $\Delta E$ (e.g., a decrease) in illuminance is less than or equal to the second illuminance change threshold $-\Delta E_{TH2}$ (e.g., indicating that the sun is positioned such that detecting a glare condition may be less likely), the control circuit may adjust (e.g., decrease) the IP rate at 534. For example, the second illuminance change threshold $-\Delta E_{TH2}$ may be a fixed value or a variable value that may be determined as a function of the present illuminance $E_{PRES}$, e.g., $-\Delta E_{TH2}=-\beta \cdot E_{PRES}$, where $\beta$ is a predetermined constant, such as 0.10 or 10%.

After comparing the change $\Delta E$ in illuminance to the second illuminance change threshold $-\Delta E_{TH2}$ at 532, performing image processing at 530, and/or adjusting the IP rate at 534, the control circuit may set previous illuminance $E_{PREV}$ to be equal to the present illuminance $E_{PRES}$ at 536. As described herein, the previous illuminance $E_{PREV}$ may be used to predict the likelihood of detecting a glare condition. For example, the previous illuminance $E_{PREV}$ may be used at later invocations of the procedure 500 to determine a change $\Delta E$ in illuminance (e.g., at 524).

Figure 6:
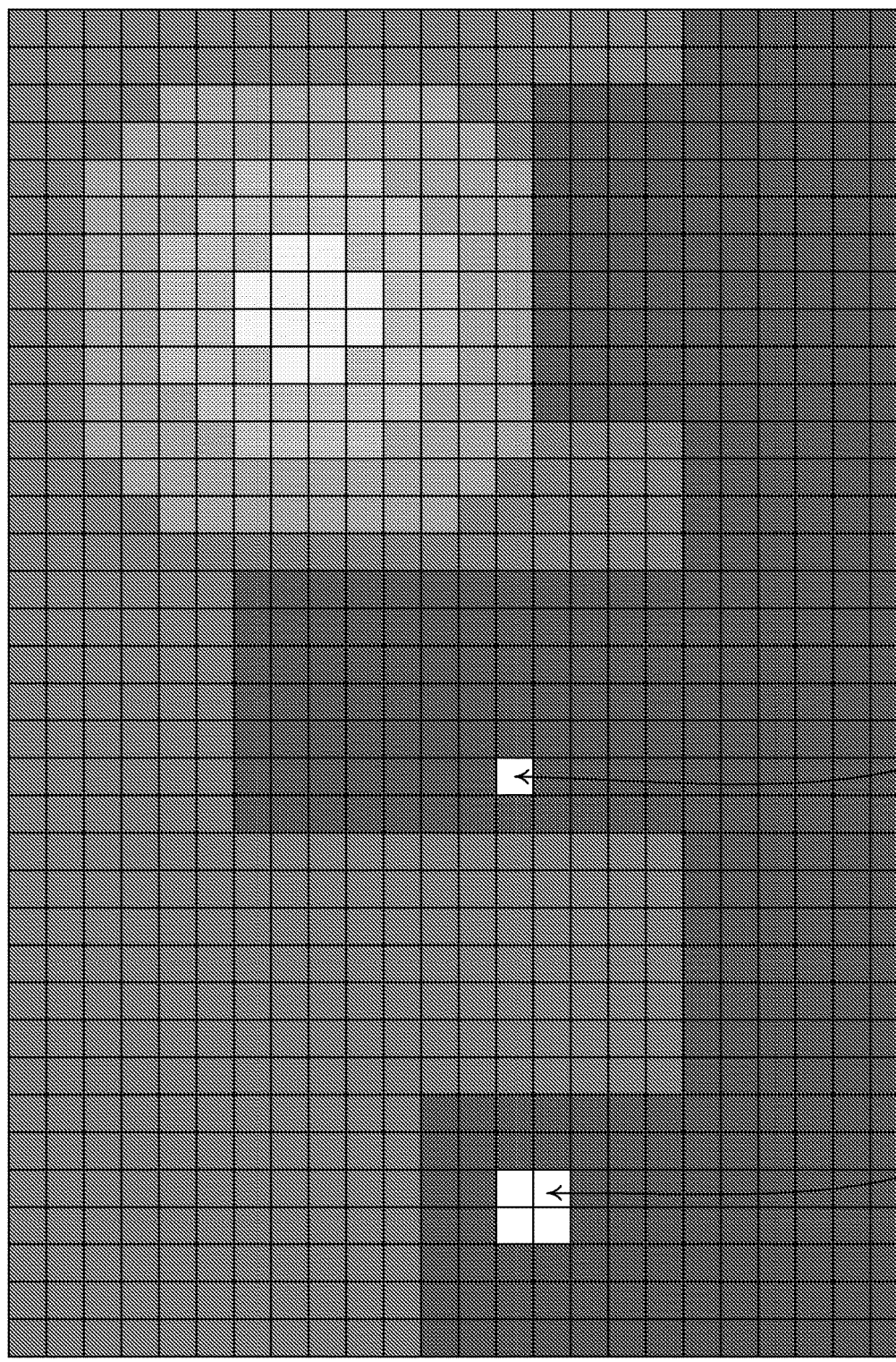
FIG. 6 is an example of a non-warped image used for glare detection.

FIG. 6 is an example of a non-warped image 600 that may be used to detect a glare condition. The non-warped image 600 may include one or more pixels that indicate a glare source (e.g., pixels 610, 608). For example, the glare source indicated by pixels 608 and 610 may be caused by reflections of the sun on small surfaces, ripples in a body of water, and/or rain drops on the window. As described herein, pixels 608 and 610 may be referred to as washed out pixel (e.g., an over-exposed pixel). A washed out pixel may be used to indicate the location of a glare condition. A visible light sensor and/or system controller may perform image processing on the image 600 to detect glare condition. For example, the image processing may include searching for washed out pixels to detect the location of glare conditions.

Figure 7:
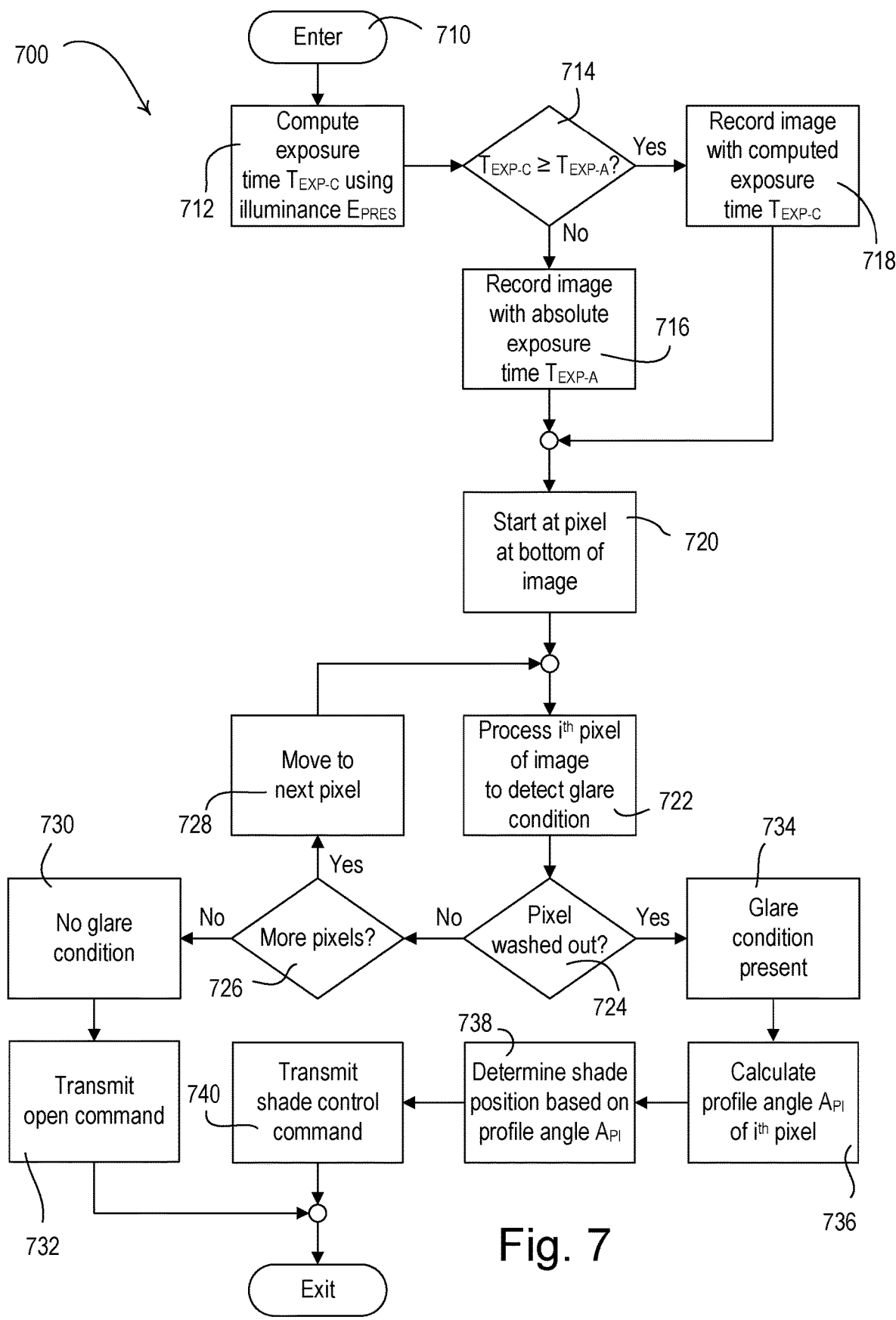
FIG. 7 shows an exemplary flowchart of an image processing procedure that may be executed by a control circuit of a visible light sensor.

FIG. 7 is an example procedure 700 that may be executed by a control circuit of a visible light sensor (e.g., the control circuit 310 and/or the image processor 322 of the visible light sensor 300) to detect glare conditions and/or determine a location of a glare source using image processing. The procedure 700 may be executed periodically (e.g., periodically at the IP rate used for the procedure 400 shown in FIG. 4 and/or at the PS rate used for the procedure 500 shown in FIG. 5). The procedure 700 may also be performed by a control circuit of one or more other devices, such as a system controller (e.g., system controller 110 shown in FIG. 1). The procedure 700 may be performed on a single device, such as a visible light sensor, or distributed across multiple devices, such as an image processor and a system controller, for example. As described herein, the visible light sensor may include a visible light sensing circuit (e.g., the visible light sensing circuit 320) and a photosensor circuit (e.g., the photosensor circuit 360) capable of detecting the illuminance of light shining on the visible light sensor. The procedure 700 may be performed in conjunction with the procedure 400 shown in FIG. 4, and/or procedure 500 shown in FIG. 5 (e.g., at step 530 of the procedure 500 and/or at step 416 of the procedure 400).

As illustrated in FIG. 7, the procedure 700 may begin at 710 (e.g. at 416 of the procedure 400 shown in FIG. 4 and/or at 530 of the procedure 500 shown in FIG. 5). Glare conditions may be detected by capturing an image at a certain exposure time (e.g., shutter speed). For example, capturing an image at a certain exposure time may wash out the pixels above a certain luminance value. After capturing an image at a respective exposure time, the visible light sensor may detect a glare condition and/or determine the location (e.g., profile angle) of a glare source based on the location of a washed out pixel. Images may be captured at different exposure times to determine the locations of glare sources due to different types of glare conditions (e.g., larger glare conditions, smaller glare conditions, absolute glare conditions and/or contrast glare conditions). For example, a contrast-based exposure time $T_{EXP-C}$ may be used to detect the location of a glare source due to contrast glare conditions (e.g., relative glare conditions) and an absolute exposure time $T_{EXP-A}$ may be used to detect the location of a glare source due to absolute glare conditions. The absolute exposure time $T_{EXP-A}$ may be fixed, and the contrast-based exposure time $T_{EXP-C}$ may be variable. The absolute exposure time $T_{EXP-A}$ may be adjusted, for example, using a configuration software running on a programming device (e.g., the mobile device 190). Determining the exposure rate at which to capture an image prior to capturing the image may allow the visible light sensor to detect glare conditions and/or to detect the location of the glare source by processing (e.g., only processing) a single image of a room. This may allow for a reduction in the amount of image processing performed by the visible light sensor, which may reduce the amount of power and/or resources used on the visible light sensor. In addition, capturing an image at a determined exposure rate may allow the control circuit to process the image the same way independent of the type of glare condition that is present.

At 712, the control circuit may compute the contrast-based exposure time $T_{EXP-C}$ using a present illuminance $E_{PRES}$. As described herein, the present illuminance $E_{PRES}$ may be determined based on an illuminance signal $V_E$ (e.g., as determined at 514 of the procedure 500 shown in FIG. 5 and/or determined at 414 of the procedure 400 shown in FIG. 4), which may be generated from the photosensor circuit. The contrast-based exposure time $T_{EXP-C}$ computed at 712 may be used to capture an image that may be used to detect contrast glare conditions and/or determine the location of a glare source due to contrast glare conditions (e.g., by washing out the pixels where a glare source is located). For example, capturing an image at the contrast-based exposure time $T_{EXP-C}$ may wash out the pixels within the image that have a luminance value greater than or equal to a threshold. Furthermore, the washed out pixels may indicate the location of a contrast glare condition. For example, the control circuit may calculate the contrast-based exposure time $T_{EXP-C}$ as a function of the present illuminance $E_{PRES}$ (e.g., $T_{EXP-C}=C*E_{PRES}+C_0$, where C and $C_0$ are constants). The contrast-based exposure time $T_{EXP-C}$ may be directly proportional to the present illuminance $E_{PRES}$ (e.g., the contrast-based exposure time $T_{EXP-C}$ may increase as the present illuminance $E_{PRES}$ increases). Also, or alternatively, the contrast-based exposure time $T_{EXP-C}$ may be inversely proportional to the luminance of washed out pixels (e.g., the higher the exposure time, the lower the level at which a pixel washes out).

At 714, the computed contrast-based exposure time $T_{EXP-C}$ may be compared to the absolute exposure time $T_{EXP-A}$ in order to determine the exposure time at which to record an image (e.g., a single LDR image) to detect a glare condition and/or determine the location of the glare source. If an exposure is captured with the contrast-based exposure time $T_{EXP-C}$, washed-out pixels of the image may identify the location of a glare source due to contrast glare conditions. If an image is captured with the absolute exposure time $T_{EXP-A}$, washed-out pixels of the image may identify the location of a glare source due to absolute glare conditions. By determining the appropriate exposure time (e.g., the absolute exposure time $T_{EXP-A}$ or the contrast-based exposure time $T_{EXP-C}$) prior to recording an image, the visible light sensor may capture an image (e.g., a single LDR image) at a single exposure time to detect the position of a glare source due to either absolute glare conditions and relative glare conditions. If the contrast-based exposure time $T_{EXP-C}$ is less than the absolute exposure time $T_{EXP-A}$ at 714, an absolute glare condition may be occurring, and the control circuit may record an image using the absolute exposure time $T_{EXP-A}$ at 716. If the contrast-based exposure time $T_{EXP-C}$ is greater than or equal to the absolute exposure time $T_{EXP-A}$ at 714, a contrast glare condition may be occurring, and the control circuit may record an image using the computed contrast-based exposure time $T_{EXP-C}$ at 716.

After capturing the image at the appropriate exposure time, the control circuit may process the image to detect a glare condition and/or to determine the position of the glare source). The control circuit may begin processing pixels in a location relative to a fully-closed position of a motorized window treatment. For example, if a motorized window treatment is located at a top of the window and lowers a shade fabric towards the bottom of the window (e.g., to a fully-closed position), the control circuit may begin processing the image from the bottom of the image. At 720, the control circuit may begin at a pixel at the bottom of the image. At 722, the control circuit may process an $i^{th}$ pixel of the image, which may be the first pixel in the bottom row of pixels in the image, in order to see if a glare condition is present. At 724, the control circuit may determine whether the present pixel (e.g., the $i^{th}$ pixel) is washed out. For example, the control circuit may determine whether a luminance value of the $i^{th}$ pixel is equal to 100 and/or if luminance values of red content, green content, and blue content (e.g., RGB values) are all at maximum luminance values (e.g., the maximum luminance value of a pixel in the image, such as 255). If the control circuit determines that the pixel is not washed out at 724, the control circuit may determine whether the image includes more unprocessed pixels at 726. If the image includes more unprocessed pixels, the control circuit may move to the next pixel at 728 and then process the next pixel at 722. The control circuit may continue to process the remaining pixels in the image to determine the lowest pixel in the image that is washed out (e.g., having the maximum luminance value of a pixel in the image). If the image does not include more unprocessed pixels, the control circuit may determine that a glare condition is not detected in the image at 730 and may transmit a command to open the motorized window treatment(s) at 732, before the procedure 700 may exit.

If the control circuit determines that the pixel is washed out at 724, the control circuit may determine that a glare condition is present at 734. As described herein, the pixel that is determined to be washed out at 724 may be the lowest pixel in the image that is washed out (e.g., having the maximum luminance value of a pixel in the image). The control circuit may then calculate a profile angle of the $i^{th}$ pixel at 736. As described herein, the profile angle may indicate location of a detected glare source outside of the room. At 738, the control circuit may determine a shade position to which to control the motorized window treatment(s) based on the profile angle. For example, determining the shade position to which to control the motorized window treatment(s) based on the profile angle may allow the motorized window treatment(s) to block the location of the glare source from the view of occupants of the room to thus prevent glare inside the room. After determining the shade position at 738, the control circuit may transmit a shade control command to the motorized window treatment(s) at 738. For example, the shade control command may include control instruction to move the motorized window treatment(s) to block the glare source (e.g., as indicated by a location $i^{th}$ pixel in the image) from the view of the occupants of the room. Also, or alternatively, the control circuit may transmit an open command or a close command after determining the shade position at 738.

Although FIG. 7 is described as using a motorized window treatment as the daylight control device, other daylight control devices may be used, such as a controllable dynamic glass. The dynamic glass may comprise one or more horizontal bands (e.g., zones) that may be controlled between a high-transmittance state and a low-transmittance state, and the dynamic glass may be controlled to the low-transmittance state to remove (e.g., block) a glare condition. And after calculating the profile angle at 736, the control circuit may determine the band that is associated with the determined profile angle and transmit control instruction to control all of the bands above the determined band to the low-transmittance state to remove the glare condition.

Figure 8:
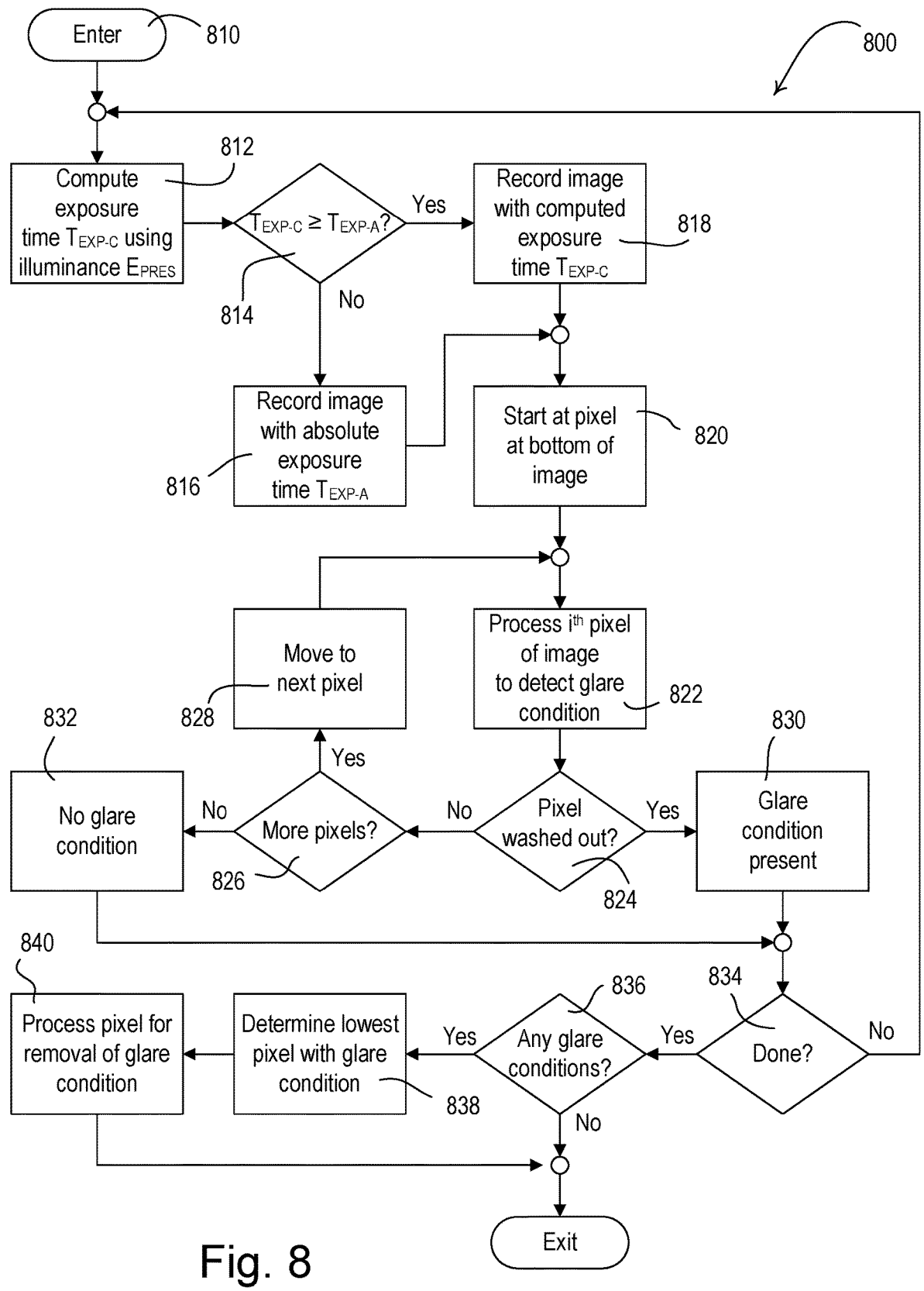
FIG. 8 shows another exemplary flowchart of an image processing procedure that may be executed by a control circuit of a visible light sensor.

FIG. 8 is an example procedure 800 that may be executed by a control circuit of a visible light sensor (e.g., the control circuit 310 and/or the image processor 322 of the visible light sensor 300) to detect glare conditions and/or determine a location of a glare source using image processing. The procedure 800 may be executed periodically (e.g., periodically at the IP rate used for the procedure 400 shown in FIG. 4 and/or at the PS rate used for the procedure 500 shown in FIG. 5). The procedure 800 may also be performed by a control circuit of one or more other devices, such as a system controller (e.g., system controller 110 shown in FIG. 1). The procedure 800 may be performed on a single device, such as a visible light sensor, or distributed across multiple devices, such as an image processor and a system controller, for example. As described herein, the visible light sensor may include a visible light sensing circuit (e.g., the visible light sensing circuit 320) and a photosensor circuit (e.g., the photosensor circuit 360) capable of detecting the illuminance of light shining on the visible light sensor. The procedure 800 may be performed in conjunction with the procedure 400 shown in FIG. 4, and/or 500 shown in FIG. 5 (e.g., at step 530 of the procedure 500 and/or at step 416 of the procedure 400).

As illustrated in FIG. 8, the procedure 800 may begin at 810 (e.g. at 416 of the procedure 400 shown in FIG. 4 and/or at 530 of the procedure 500 shown in FIG. 5). Glare conditions may be detected by capturing an image at a certain exposure time (e.g., shutter speed). For example, capturing an image at a certain exposure time may wash out the pixels above a certain luminance value. After capturing an image at a respective exposure time, the visible light sensor may detect a glare condition and/or determine the location (e.g., profile angle) of a glare source based on the location of a washed out pixel. Images may be captured at different exposure times to determine the locations of glare sources due to different types of glare conditions (e.g., absolute glare conditions and/or contrast glare conditions). For example, a contrast-based exposure time $T_{EXP-C}$ may be used to detect the location of a glare source due to contrast glare conditions (e.g., relative glare conditions) and an absolute exposure time $T_{EXP-A}$ may be used to detect the location of a glare source due to absolute glare conditions. The absolute exposure time $T_{EXP-A}$ may be fixed and/or may be dependent upon the resolution of the image being processed. The contrast-based exposure time $T_{EXP-C}$ may be variable. Determining an exposure rate to which to capture an image prior to capturing the image may allow the visible light sensor to detect glare conditions and/or to detection the location of the glare source by processing (e.g., only processing) a single image and/or only a few images. This may allow for a reduction in the amount of image processing performed by the visible light sensor, which may reduce the amount of power and/or resources used on the visible light sensor.

At 812, the control circuit may compute the contrast-based exposure time $T_{EXP-C}$ using a present illuminance $E_{PRES}$. As described herein, the present illuminance $E_{PRES}$ may be determined based on an illuminance signal $V_E$ (e.g., as determined at 514 of the procedure 500 shown in FIG. 5 and/or determined at 414 of the procedure 400 shown in FIG. 4), which may be generated from the photosensor circuit. The contrast-based exposure time $T_{EXP-C}$ computed at 812 may be used to capture an image that may be used to detect contrast glare conditions and/or determine the location of a glare source due to contrast glare conditions (e.g., by washing out the pixels where a glare source is located). For example, capturing an image at the contrast-based exposure time $T_{EXP-C}$ may wash out the pixels within the image that have a luminance value greater than or equal to a threshold. Furthermore, the washed out pixels may indicate the location of a contrast glare condition. For example, the control circuit may calculate the contrast-based exposure time $T_{EXP-C}$ as a function of the present illuminance $E_{PRES}$ (e.g., $T_{EXP-C}=C*E_{PRES}+C_0$, where C and $C_0$ are constants). Also, or alternatively, the control circuit may calculate the contrast-based exposure time $T_{EXP-C}$ as a function of the resolution of the image and/or the type of glare condition that the control circuit is attempting to detect (e.g., constants C and $C_0$ may be dependent on the resolution of the image and/or the type of glare condition being detected). As described herein, the contrast-based exposure time $T_{EXP-C}$ may be directly proportional to the present illuminance $E_{PRES}$ (e.g., the exposure time $T_{EXP-C}$ may increase as the present illuminance $E_{PRES}$ increases). Also, or alternatively, the contrast-based exposure time $T_{EXP-C}$ may be inversely proportional to the luminance of washed out pixels (e.g., the higher the exposure time, the lower the level at which a pixel washes out).

At 814, the computed contrast-based exposure time $T_{EXP-C}$ may be compared to the absolute exposure time $T_{EXP-A}$ in order to determine the exposure time at which to record an image (e.g., a single LDR image) to detect a glare condition and/or determine the location of the glare source at a present resolution of the image. If an image is captured with the contrast-based exposure time $T_{EXP-C}$, washed-out pixels of the image may identify the location of a glare source due to contrast glare conditions. If an image is captured with the absolute contrast time $T_{EXP-A}$, washed-out pixels of the image may identify the location of a glare source due to absolute glare conditions. As described herein, constants may be used to determine $T_{EXP-C}$.

If the contrast-based exposure time $T_{EXP-C}$ is less than the absolute exposure time $T_{EXP-A}$ at 814, an absolute glare condition may be occurring, and the control circuit may record an image using the absolute exposure time $T_{EXP-A}$ at 816. If the contrast-based exposure time $T_{EXP-C}$ is greater than or equal to the $T_{EXP-A}$, a contrast glare condition may be occurring, and the control circuit may record an image using the computed contrast-based exposure time $T_{EXP-C}$ at 816 The control circuit may record the image at 816 or 818 using a desired resolution. For example, the control circuit may record the image at 816 or 818 using a low resolution in order to detect large-sized glare sources. In addition, the control circuit may record the image at 816 or 818 using a high resolution in order to detect small-sized glare sources.

After capturing the image at the appropriate exposure time, the control circuit may process the image to detect a glare condition and/or to determine the position of the glare source). The control circuit may begin processing groups of pixels in a location relative to a fully-closed position of a motorized window treatment. For example, if a motorized window treatment is located at a top of the window and lowers a shade fabric towards the bottom of the window (e.g., to a fully-closed position), the control circuit may begin processing the image from the bottom of the image. At 820, the control circuit may begin at a pixel at the bottom of the image. At 822, the control circuit may process an $i^{th}$ pixel of the image, which may be the first pixel in the bottom row of pixels, in order to see if a glare condition is present. At 824, the control circuit may determine whether the present pixel (e.g., the $i^{th}$ pixel) is washed out. For example, the control circuit may determine whether a luminance value of the $i^{th}$ pixel is equal to 100 and/or if luminance values of red content, green content, and blue content (e.g., RGB values) are all at maximum values (e.g., 255). If the control circuit determines that the pixel is not washed out at 824, the control circuit may determine whether the image includes more unprocessed pixels at 826. If more unprocessed pixels are in the image, the control circuit may move to the next pixel at 828. If the image does not include more unprocessed pixels, the control circuit may determine that a glare condition is not detected in the image. If the control circuit determines that the pixel is washed out at 824, the control circuit may determine that a glare condition is present at 830, which may include storing (e.g., storing in memory) a position of the glare condition (e.g., the position of the $i^{th}$ pixel).

As illustrated in FIG. 8, and further described herein, the procedure 800 may capture and/or process images at multiple resolutions. For example, different resolutions may be used to detect different types of glare conditions (e.g., larger glare conditions and/or smaller glare conditions). For example, the control circuit may record images using a low resolution (e.g., a minimum resolution) in order to detect larger glare sources, using a high resolution (e.g., a maximum resolution) in order to detect smaller glare sources, and/or a resolution between the low resolution and the high resolution in order to detect glare sources of other sizes. The values of the absolute exposure time $T_{EXP-A}$ and the contrast-based exposure time $T_{EXP-C}$ may be differ and/or may be adjusted based on the resolution of the image to be processed to detect a glare condition and/or determine the location of a glare source. For example, the constants used to calculate the contrast-based exposure time $T_{EXP-C}$ (e.g., constants C and $C_0$) may be dependent upon the resolution of the image to be processed.

At 834, the control circuit may determine whether the procedure 800 is done. For example, at 834, the control circuit may determine that the procedure 800 is not done in order to detect glare conditions of a different size. The control circuit may then compute the contrast-based exposure time $T_{EXP-C}$ at 812 using the appropriate values for constants C and $C_0$ depending upon the intended resolution of the image to be processed (e.g., processed at 822). For example, the control circuit may recall the appropriate values for constants C and $C_0$ from memory at 812 depending upon the intended resolution of the image to be processed. The control circuit may compare the computed contrast-based exposure time $T_{EXP-C}$ to the absolute exposure time $T_{EXP-A}$ at 814, where the value of the absolute exposure time $T_{EXP-A}$ may be recalled from memory and may be dependent upon the resolution of the image to be processed. At 816 or 818, the control circuit may record the image using the appropriate exposure time. For example, the control circuit may record the image at 816 or 818 using the intended resolution (e.g., the control circuit may record an image at the high resolution the first time that 816 or 818 is executed, and then record an image at the low resolution the second time that 816 or 818 is executed. In addition, the control circuit may record the image at 816 or 818 using a fixed resolution (e.g., the high resolution) and then subsequently reducing the resolution of the image to another resolution (e.g., the low resolution) before processing the image at 822.

If the control circuit determines that the procedure 800 is done at 834, the control circuit may determine at 836 whether there were any glare conditions detected (e.g., if there were any washed out pixels at 824 for any of the executions of 824). For example, the control circuit may determine whether any glare conditions were detected by querying the memory (e.g., retrieving the positions of one or more pixels that may indicate a glare condition from memory). At 838, the control circuit may determine the lowest pixel of those retrieved from memory at 836. At 840, the control circuit may process the lowest pixel that indicates a glare condition for removal of the glare condition. For example, the control circuit may process a pixel for removal of a glare condition by executing one or of the following: calculating a profile angle of the pixel with a glare condition, determining a shade position based on the profile angle, transmitting a shade control command to a motorized window treatment that includes control instructions to indicate the shade position, transmitting an open command to the motorized window treatment, and/or transmitting a close command to the motorized window treatment. Further, processing a pixel for removal of a glare condition may include steps similar to steps 734, 736, and/or 738 of the procedure 700. Also, or alternatively, processing the pixel for removal of the glare condition may include controlling the each of the bands of a controllable dynamic glass that are above the detected glare condition to a low-transmittance state.

Figure 9A:
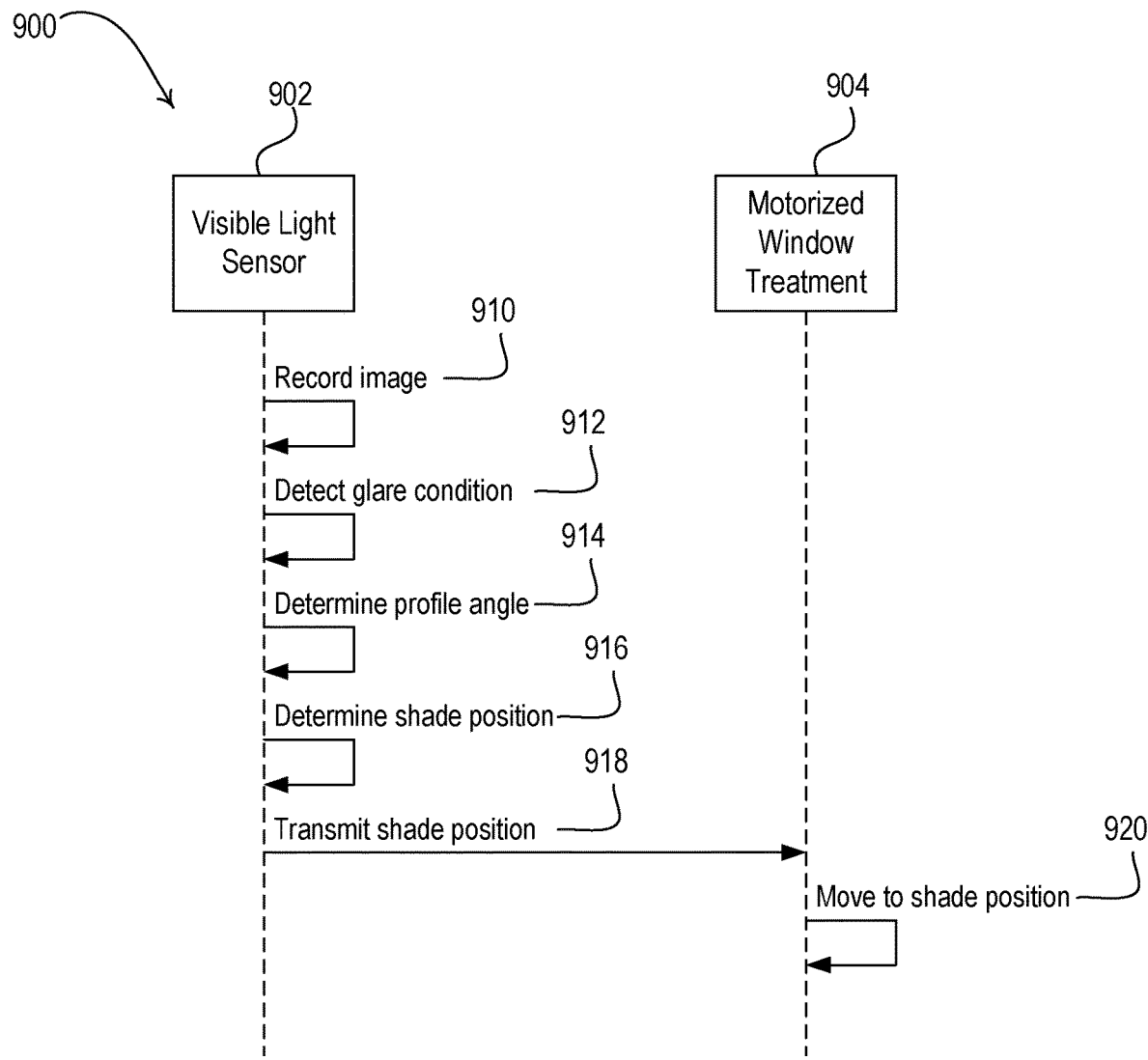
FIG. 9A shows a sequence diagram of an example glare detection procedure that may be executed by a visible light sensor and a motorized window treatment.

FIG. 9A is a sequence diagram 900 illustrating communications between control devices during an example glare prevention procedure. As seen in FIG. 9A the glare prevention procedure may be performed by a visible light sensor 902 (e.g., the visible light sensor 182, 300) and a motorized window treatment 904 (e.g., the motorized roller shade 220). At 910, the visible light sensor 902 may record an image of the outside of a room and/or building. At 912, the visible light sensor may process the image to detect a glare condition. For example, the detection of a glare condition may include one or more steps from the procedure 400, 500, 700, and/or 800.

If a glare condition is detected, the visible light sensor 902 may determine a profile angle of the glare condition at 914. As described herein, the profile angle may define the position of the glare source outside of a window (e.g., the window 202 in FIG. 2). The profile angle may be determined based on the location of the detected glare source (e.g., a pixel in the image recorded at 910). The visible light sensor 902 may comprise a lookup table to determine the profile angle. For example, the lookup table may provide an indication of the profile angle based on the location (e.g., a pixel in the image recorded at 910) of the detected glare source.

At 916, the visible light sensor 902 may determine the shade position for the motorized window treatment 904. The shade position may prevent a glare condition from affecting a room (e.g., the room 102 and/or the space 200). For example, the shade fabric may be positioned such that the shade fabric blocks light from the glare source represented by the pixel where the glare was detected. At 918, the shade position may be transmitted to the motorized window treatment 904. After receiving the shade position, the motorized window treatment may move the shade fabric to the indicated position at 920.

Figure 9B:
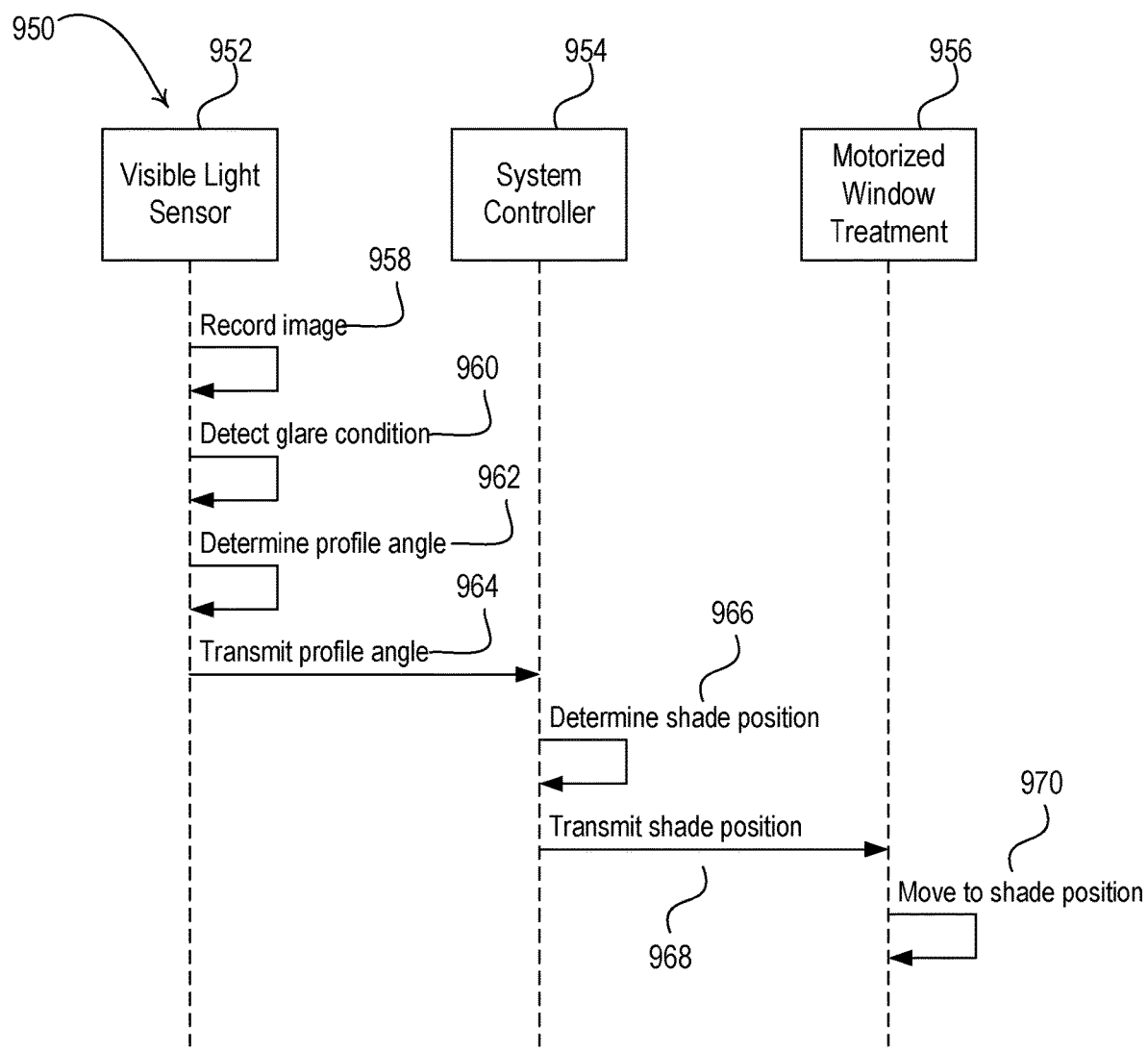
FIG. 9B shows a sequence diagram of an example glare detection procedure that may be executed by a visible light sensor, a system controller, and a motorized window treatment.

FIG. 9B is a sequence diagram 950 illustrating communications between control devices during an example glare prevention procedure. As seen in FIG. 9B, the glare prevention procedure may be performed by a visible light sensor 952 (e.g., the visible light sensor 182, 300), a system controller 954 (e.g., the system controller 110), and a motorized window treatment 956 (e.g., the motorized roller shade 220). At 958, the visible light sensor 952 may record an image of the outside of a room and/or building. At 960, the visible light sensor may process the image to detect a glare condition. For example, the detection of a glare condition may include one or more steps from the procedure 400, 500, 600, and/or 700.

If a glare condition is detected, the visible light sensor 952 may determine a profile angle of the glare condition at 962. As described herein, the profile angle may define the position of the glare source outside of a window (e.g., the window 202 in FIG. 2). The profile angle may be determined based on the location of the detected glare source (e.g., a pixel in the image recorded at 958). The visible light sensor 952 may comprise a lookup table to determine the profile angle. For example, the lookup table may provide an indication of the profile angle based on the location (e.g., a pixel in the image recorded at 958) of the detected glare source.

At 964, the visible light sensor 952 may transmit the profile angle to the system controller 954. At 966, the system controller 954 may determine a shade position for the motorized window treatment 956. For example, the shade fabric may be positioned such that the shade fabric blocks light from the glare source represented by the pixel where a glare was detected. At 968, the system controller 954 may transmit the shade position to the motorized window treatment 956. After receiving the shade position, the motorized window treatment may move the shade fabric to the indicated position at 970. Though the visible light sensor 952 is shown as processing the image, the system controller 954 may also, or alternatively, perform the image processing after the visible light sensor 952 generates the image.

Figure 10:
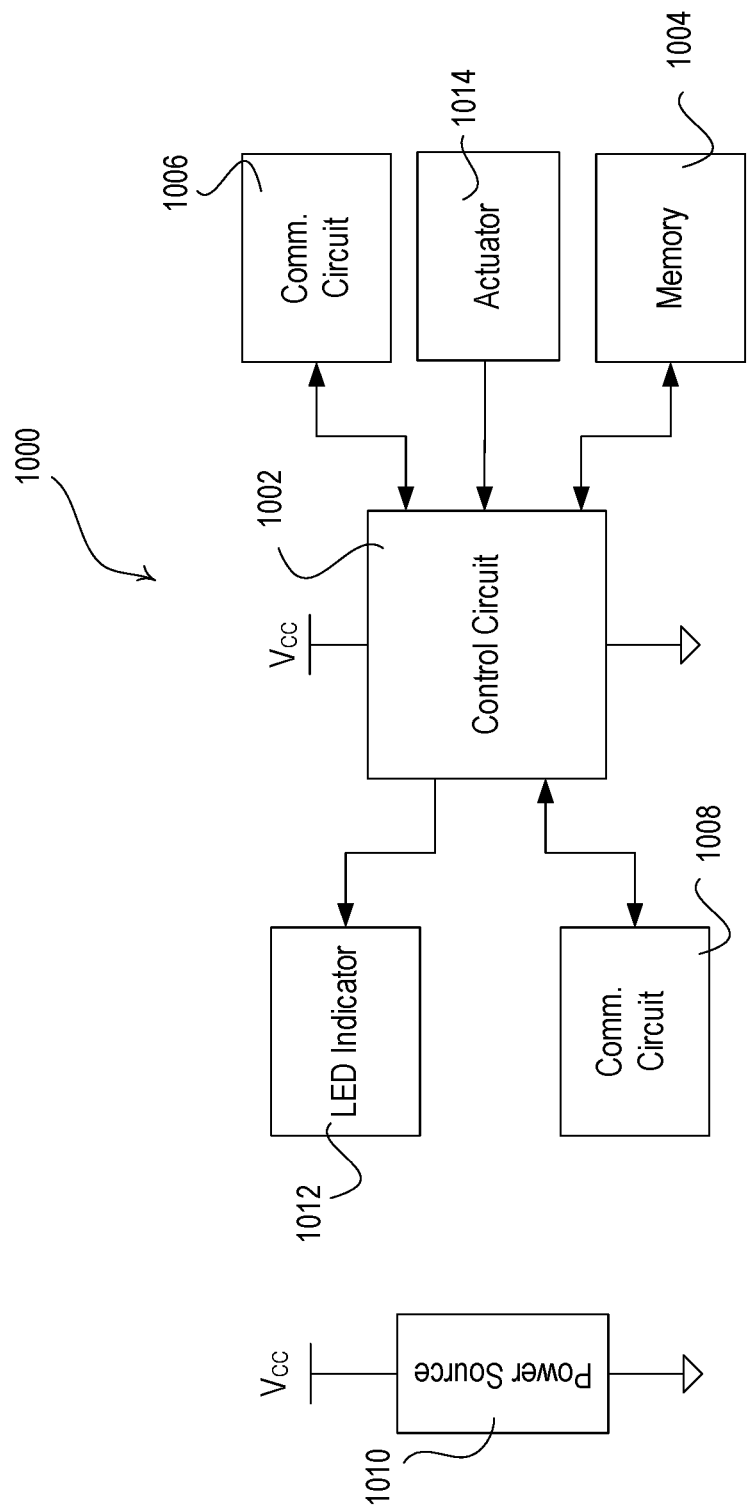
FIG. 10 is a block diagram of an example system controller.

FIG. 10 is a block diagram illustrating an example system controller 1000 (such as system controller 110, described herein). The system controller 1000 may include a control circuit 1002 for controlling the functionality of the system controller 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 1002 may perform signal coding, data processing, image processing, power control, input/output processing, or any other functionality that enables the system controller 1000 to perform as described herein. The control circuit 1002 may store information in and/or retrieve information from the memory 1004. The memory 1004 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1000 may include a communications circuit 1006 for transmitting and/or receiving information. The communications circuit 1006 may perform wireless and/or wired communications. The system controller 1000 may also, or alternatively, include a communications circuit 1008 for transmitting and/or receiving information. The communications circuit 1006 may perform wireless and/or wired communications. Communications circuits 1006 and 1008 may be in communication with control circuit 1002. The communications circuits 1006 and 1008 may include RF transceivers or other communications modules capable of performing wireless communications via an antenna. The communications circuit 1006 and communications circuit 1008 may be capable of performing communications via the same communication channels or different communication channels. For example, the communications circuit 1006 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1008 may be capable of communicating (e.g., with control devices and/or other devices in the load control system) via another wireless communication channel (e.g., WI-FI®, Zigbee®, Thread® or a proprietary communication channel, such as Clear Connect®).

The control circuit 1002 may be in communication with an LED indicator 1012 for providing indications to a user. The control circuit 1002 may be in communication with an actuator 1014 (e.g., one or more buttons) that may be actuated by a user to communicate user selections to the control circuit 1002. For example, the actuator 1014 may be actuated to put the control circuit 1002 in an association mode and/or communicate association messages from the system controller 1000.

Each of the modules within the system controller 1000 may be powered by a power source 1010. The power source 1010 may include an AC power supply or DC power supply, for example. The power source 1010 may generate a supply voltage $V_{CC}$ for powering the modules within the system controller 1000.

Figure 11:
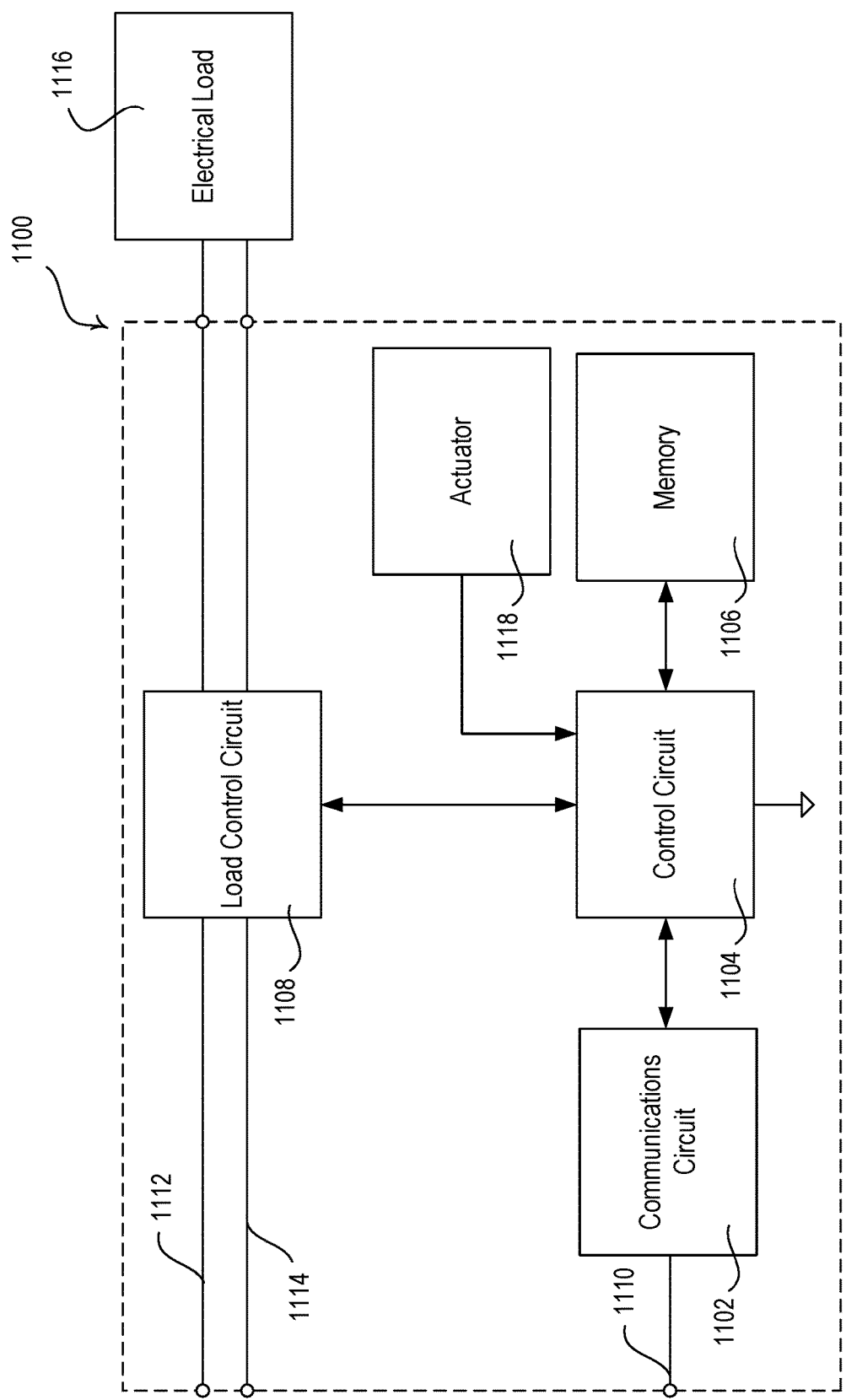
FIG. 11 is a block diagram of an example control-target device.

FIG. 11 is a block diagram illustrating an example control-target device, e.g., a load control device 1100, as described herein. The load control device 1100 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1100 may include a communications circuit 1102. The communications circuit 1102 may include a receiver, an RF transceiver, or other communications module capable of performing wired and/or wireless communications via communications link 1110. The communications circuit 1102 may be in communication with control circuit 1104. The control circuit 1104 may include one or more general purpose processors, special purpose processors, conventional processors, digital signal processors (DSPs), microprocessors, integrated circuits, a programmable logic device (PLD), application specific integrated circuits (ASICs), or the like. The control circuit 1104 may perform signal coding, data processing, power control, input/output processing, or any other functionality that enables the load control device 1100 to perform as described herein.

The control circuit 1104 may store information in and/or retrieve information from the memory 1106. For example, the memory 1106 may maintain a registry of associated control devices and/or control instructions. The memory 1106 may include a non-removable memory and/or a removable memory. The load control circuit 1108 may receive instructions from the control circuit 1104 and may control the electrical load 1116 based on the received instructions. For example, the electrical load 1116 may control a motorized window treatment (e.g., motorized window treatments 150). The load control circuit 1108 may send status feedback to the control circuit 1104 regarding the status of the electrical load 1116. The load control circuit 1108 may receive power via the hot connection 1112 and the neutral connection 1114 and may provide an amount of power to the electrical load 1116. The electrical load 1116 may include any type of electrical load.

The control circuit 1104 may be in communication with an actuator 1118 (e.g., one or more buttons) that may be actuated by a user to communicate user selections to the control circuit 1104. For example, the actuator 1118 may be actuated to put the control circuit 1104 in an association mode and/or communicate association messages from the load control device 1100.

Although features and elements are described herein in particular combinations, each feature or element can be used alone or in any combination with the other features and elements. For example, the functionality described herein may be described as being performed by a control device, such as a remote control device or a lighting device, but may be similarly performed by a hub device or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

While the methods described herein are described with reference to controlling motorized window treatments (e.g., the motorized window treatments 150 and/or the motorized roller shade 220) for preventing glare conditions, the methods may be used to control other types of daylight control devices to prevent and/or alleviate glare conditions. For example, the methods described herein could be used to control the transmittance of controllable dynamic glass (e.g., smart glass and/or electrochromic glass) and/or to adjust the positions of indoor or outdoor controllable louvers to prevent and/or alleviate glare conditions. For example, the dynamic glass may comprise one or more horizontal bands (e.g., zones) that may be controlled individually or across each horizontal band between a high-transmittance state and a low-transmittance state. The dynamic glass may be controlled to the low-transmittance state to remove (e.g., block) a glare condition. The dynamic glass may be controlled in each band similarly to controlling a window shade of a motorized window treatment as described herein. The band of the dynamic glass that is controlled to the low-transmittance state may be determined based on the determined profile angle of the glare source. For example, each of the bands above the band that is determined based on the determined profile angle of the glare source may be controlled to the low-transmittance state.

What is claimed is:

1. A device for detecting a glare condition, the device comprising:
    a photo sensing circuit configured to generate an illuminance signal, wherein the illuminance signal is generated based on light shining on the photo sensing circuit;
    a visible light sensing circuit configured to record images to detect glare conditions at an image processing rate; and
    a control circuit configured to:
        receive the illuminance signal from the photo sensing circuit,
        determine a present illuminance value based on the illuminance signal,
        adjust the image processing rate for detecting glare conditions based on the present illuminance value determined based on the illuminance signal,
        process images at the adjusted image processing rate to detect a glare condition, and
        determine a position of the glare condition.

2. The device of claim 1, further comprising:
    a communication circuit configured to transmit signals, wherein the control circuit is further configured to transmit the determined position of the glare condition.

3. The device of claim 2, wherein the determined position of the glare condition is transmitted to a system controller of a load control system.

4. The device of claim 3, wherein the determined position of the glare condition is transmitted to the system controller to allow for adjustment of a position of a covering material of a motorized window treatment based on the position of the glare condition.

5. The device of claim 1, further comprising:
    a communication circuit configured to transmit signals;
    wherein the control circuit is further configured to transmit control instructions, via the communication circuit, based on the images recorded by the visible light sensing circuit.

6. The device of claim 5, wherein the control instructions are configured to control a daylight control device.

7. The device of claim 1, wherein the control circuit is further configured to:
    determine a change in illuminance value based on the present illuminance value and a previous illuminance value; and
    compare the change in illuminance value to an illuminance change threshold, wherein when the change in illuminance value is greater than or equal to the illuminance change threshold, the image processing rate is adjusted based on the change in illuminance value.

8. The device of claim 1, wherein the control circuit is further configured to compare the present illuminance value to an illuminance threshold, wherein the control circuit adjusts the image processing rate to zero to cause the visible light sensing circuit to cease recording images on a condition that the present illuminance value is less than the illuminance threshold.

9. The device of claim 1, wherein the control circuit is configured to determine the present illuminance value based on the illuminance signal at a photo sensing rate.

10. A method comprising:
    recording images to detect glare conditions at an image processing rate via a visible light sensing circuit;
    receiving an illuminance signal from a photo sensing circuit;
    determining a present illuminance value based on the illuminance signal;
    adjusting the image processing rate for detecting glare conditions based on the present illuminance value;
    processing images at the adjusted image processing rate to detect a glare condition; and
    determining a position of the glare condition.

11. The method of claim 10, further comprising transmitting the determined position of the glare condition.

12. The method of claim 11, wherein the determined position of the glare condition is transmitted to a system controller of a load control system to allow for adjustment of a position of a covering material of a motorized window treatment based on the position of the glare condition.

13. The method of claim 10, further comprising transmitting control instructions to control a daylight control device based on the images recorded by the visible light sensing circuit.

14. The method of claim 10, further comprising:
    determining a change in illuminance value based on the present illuminance value and a previous illuminance value; and
    comparing the change in illuminance value to an illuminance change threshold, wherein when the change in illuminance value is greater than or equal to the illuminance change threshold, the image processing rate is adjusted based on the change in illuminance value.

15. The method of claim 10, further comprising comparing the present illuminance value to an illuminance threshold, wherein the image processing rate is adjusted to zero to cause the visible light sensing circuit to cease recording images on a condition that the present illuminance value is less than the illuminance threshold.

16. The method of claim 10, further comprising determining the present illuminance value based on the illuminance signal at a photo sensing rate.

17. A non-transitory computer readable storage medium with program instructions stored thereon that, when executed by a control circuit, cause the control circuit to:

retrieve images to detect glare conditions at an image processing rate;
receive an illuminance signal from a photo sensing circuit;
determine a present illuminance value based on the illuminance signal;
adjust an image processing rate for detecting glare conditions based on the present illuminance value;
process images at the adjusted image processing rate to detect a glare condition; and
determine a position of the glare condition.

18. The non-transitory computer readable storage medium of claim 17, wherein the program instructions, when executed by the control circuit, further cause the control circuit to transmit the determined position of the glare condition.

19. The non-transitory computer readable storage medium of claim 18, wherein the determined position of the glare condition is transmitted to a system controller of a load control system to allow for adjustment of a position of a covering material of a motorized window treatment based on the position of the glare condition.

20. The non-transitory computer readable storage medium of claim 17, wherein the program instructions, when executed by the control circuit, further cause the control circuit to transmit control instructions to control a daylight control device based on the images recorded by the visible light sensing circuit.

21. The non-transitory computer readable storage medium of claim 17, wherein the program instructions, when executed by the control circuit, further cause the control circuit to:
determine a change in illuminance value based on the present illuminance value and a previous illuminance value; and
compare the change in illuminance value to an illuminance change threshold, wherein when the change in illuminance value is greater than or equal to the illuminance change threshold, the image processing rate is adjusted based on the change in illuminance value.

22. The non-transitory computer readable storage medium of claim 17, wherein the program instructions, when executed by the control circuit, further cause the control circuit to compare the present illuminance value to an illuminance threshold, wherein the image processing rate is adjusted to zero to cause the visible light sensing circuit to cease recording images on a condition that the present illuminance value is less than the illuminance threshold.

23. The non-transitory computer readable storage medium of claim 17, wherein the program instructions, when executed by the control circuit, further cause the control circuit to determine the present illuminance value based on the illuminance signal at a photo sensing rate.

* * * * *